(12) United States Patent
Hiromori et al.

(10) Patent No.: US 6,989,784 B2
(45) Date of Patent: Jan. 24, 2006

(54) TRANSMISSION-RECEPTION APPARATUS AND OPERATION DETERMINATION METHOD THEREOF

(75) Inventors: Masaki Hiromori, Kanagawa (JP); Kimihisa Yoneda, Hyogo (JP)

(73) Assignees: Fujitsu Ten Limited, Kobe (JP); Fujitsu Limited, Kawasaki (JP)

( * ) Notice: Subject to any disclaimer, the term of this patent is extended or adjusted under 35 U.S.C. 154(b) by 0 days.

(21) Appl. No.: 10/855,590

(22) Filed: May 28, 2004

(65) Prior Publication Data

US 2005/0219117 A1    Oct. 6, 2005

(30) Foreign Application Priority Data

Jun. 4, 2003    (JP)    ............................. 2003-159939

(51) Int. Cl.
*G01S 7/40*    (2006.01)

(52) U.S. Cl. ..................... 342/165; 342/173; 342/70; 342/82; 342/88

(58) Field of Classification Search ................ 342/165, 342/173, 174, 70–72, 82, 85, 88, 195
See application file for complete search history.

(56) References Cited

U.S. PATENT DOCUMENTS

| | | | | |
|---|---|---|---|---|
| 4,008,475 A | * | 2/1977 | Johnson | ........................ 342/83 |
| 4,017,856 A | * | 4/1977 | Wiegand | ...................... 342/15 |
| 4,899,157 A | * | 2/1990 | Sanford et al. | ................ 342/40 |
| 5,160,933 A | * | 11/1992 | Hager | ......................... 342/174 |
| 5,886,663 A | * | 3/1999 | Broxon et al. | .............. 342/165 |
| 6,762,712 B2 | * | 7/2004 | Kim | ............................ 342/135 |
| 2001/0015699 A1 | * | 8/2001 | Chiles et al. | ................ 342/120 |

FOREIGN PATENT DOCUMENTS

JP    A 5-341039    12/1993

* cited by examiner

*Primary Examiner*—John B. Sotomayor
(74) *Attorney, Agent, or Firm*—Oliff & Berridge, PLC

(57) ABSTRACT

A transmission-reception apparatus includes a transmission section, a reception section, a transmission control section, a signal detection section, and an operation determination section. The transmission section transmits a signal to a surrounding space. The reception section receives the signal from the surrounding space. The transmission control section controls the transmission section to transmit the signal in a pulse shape. The signal detection section detects level of the signal received by the reception section. The operation determination section determines as to whether or not a timing at which the level of the received signal exceeds a first determination level is within a first time period on the basis of detection result and a timing at which the transmission control section controls the transmission section to transmit the signal in the pulse shape, to determine as to whether or not the transmission section and the reception section operate normally.

11 Claims, 21 Drawing Sheets

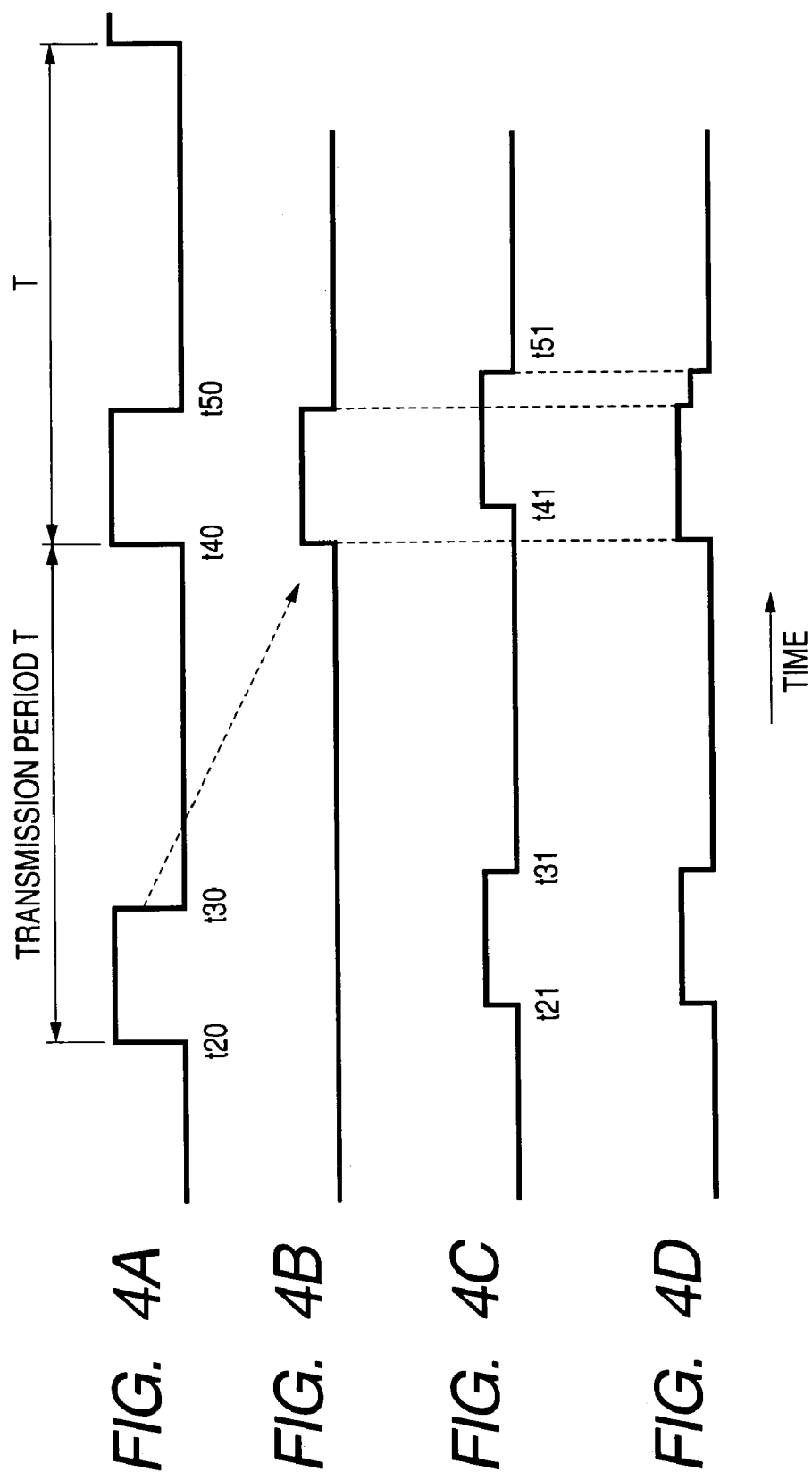

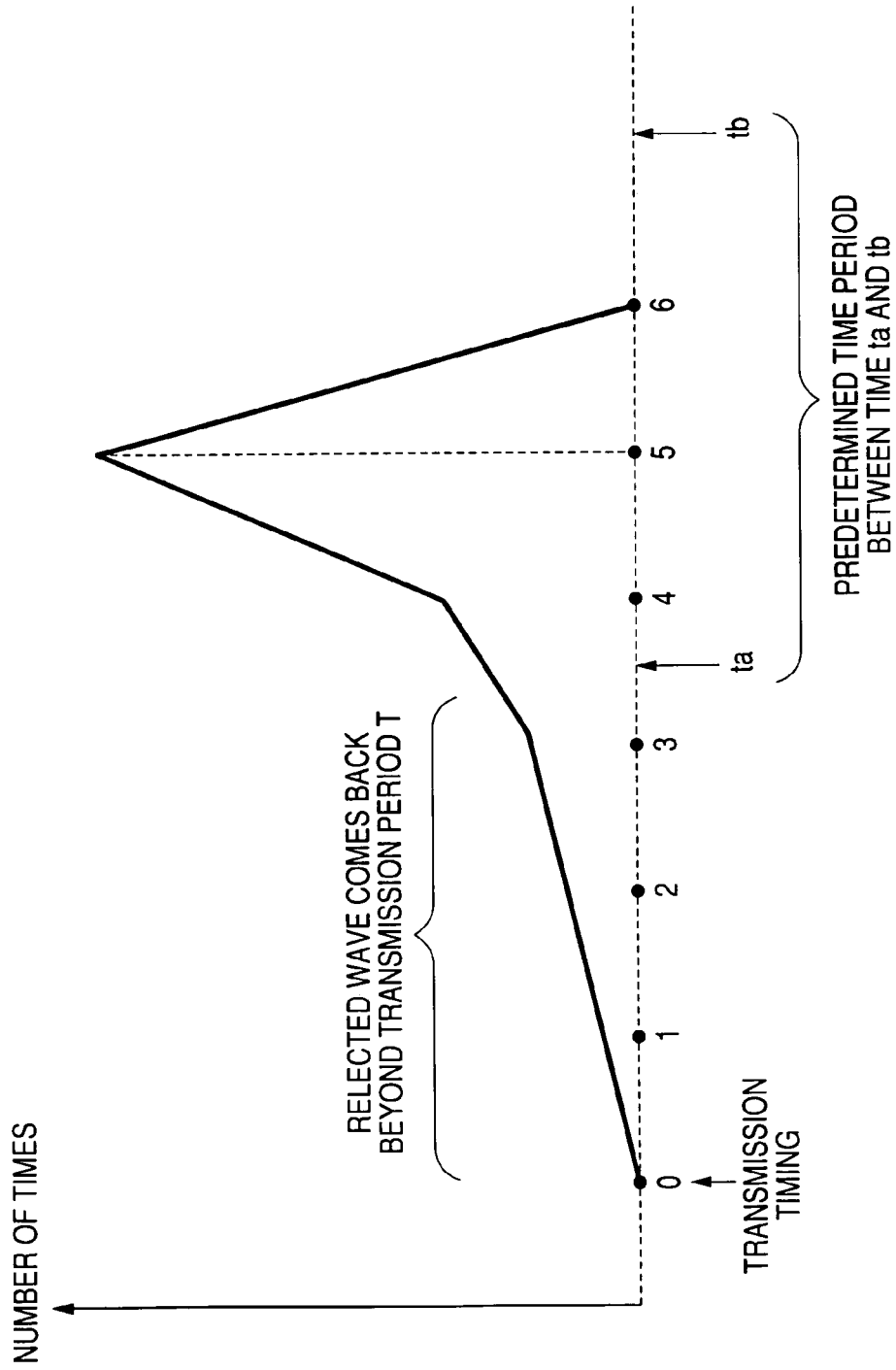

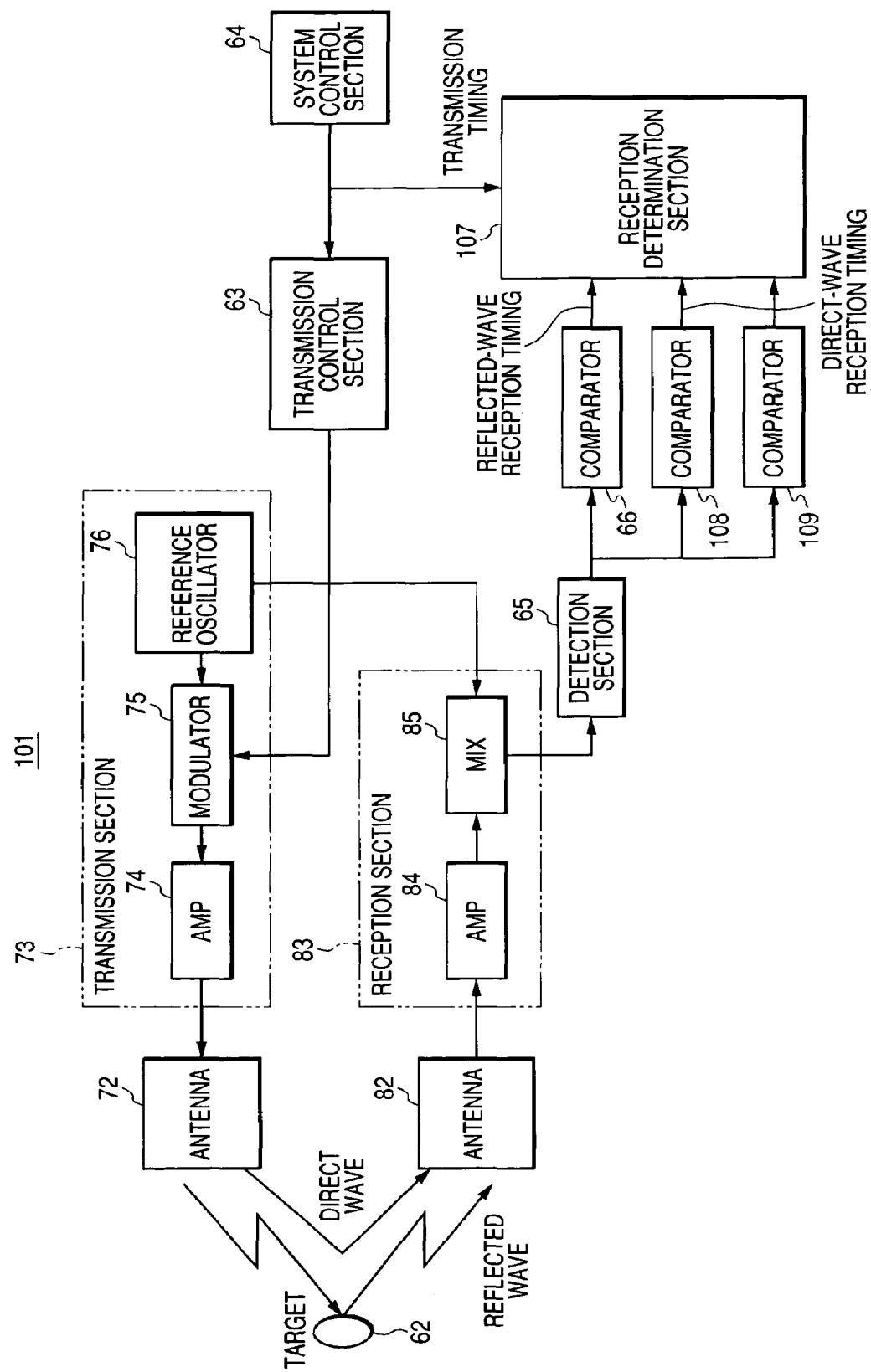

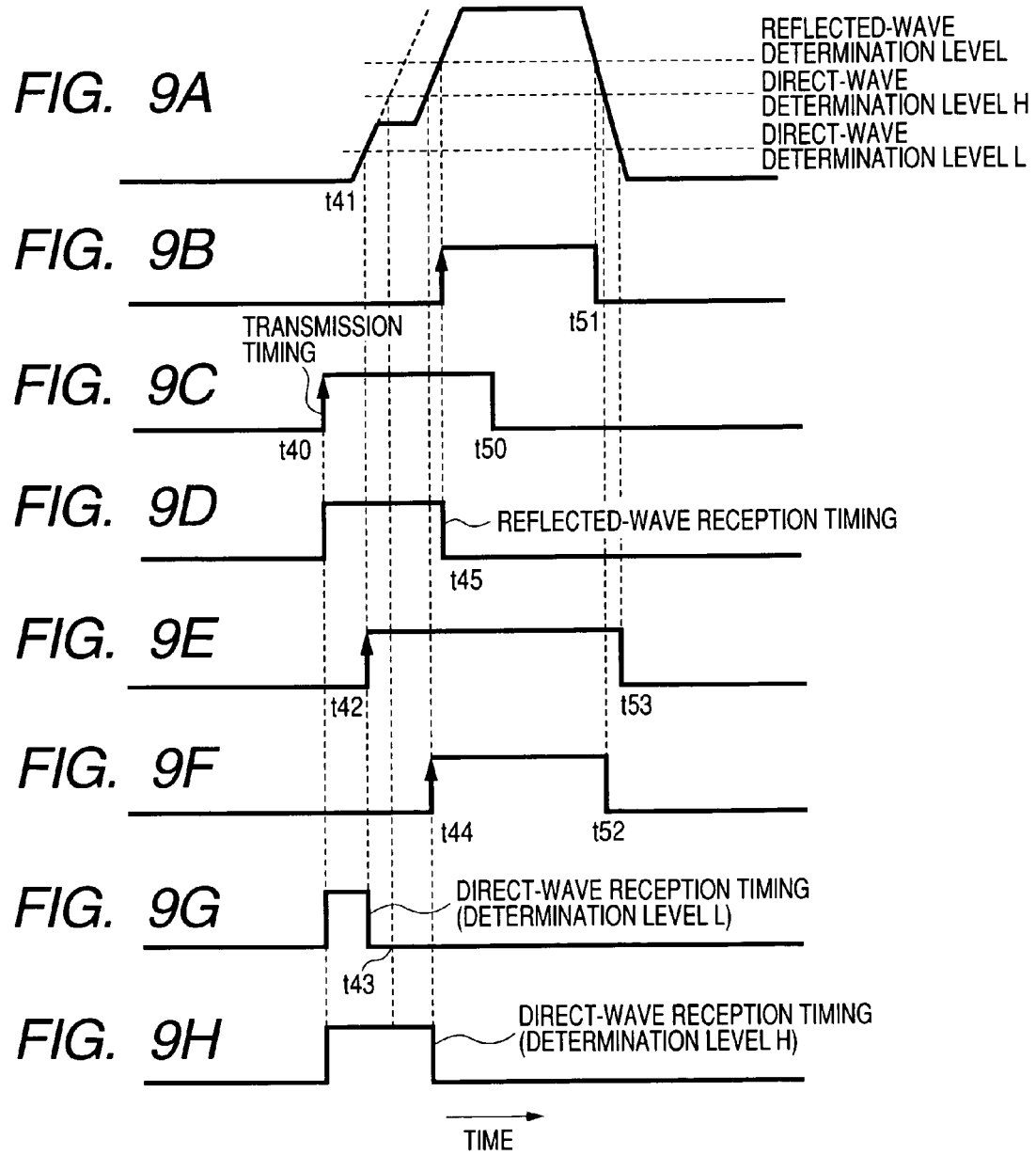

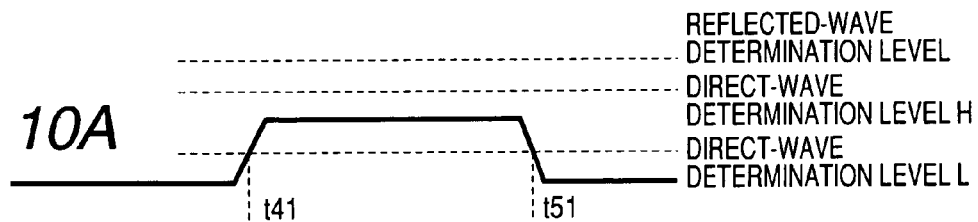
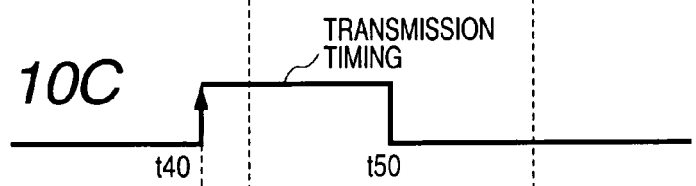

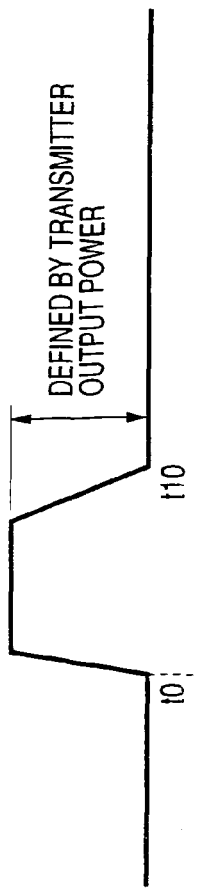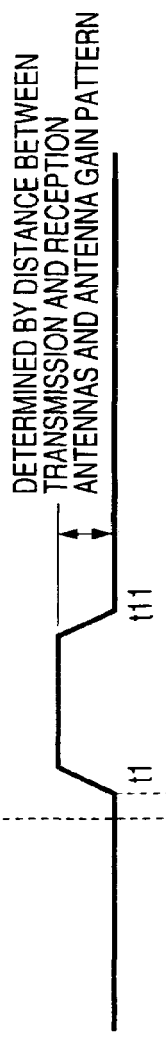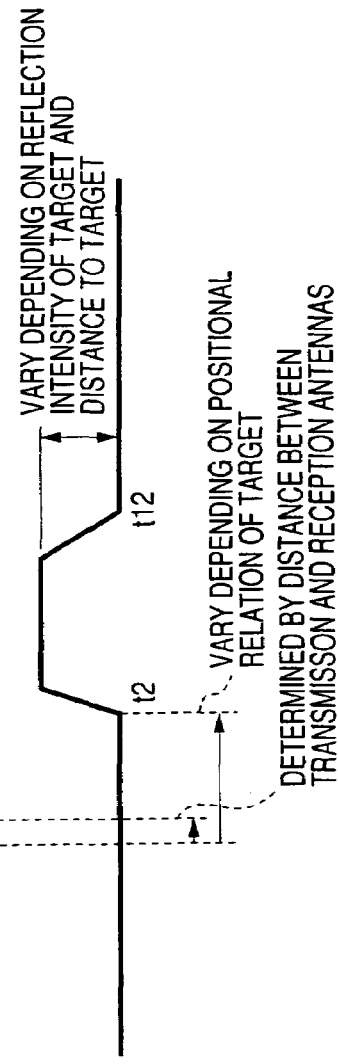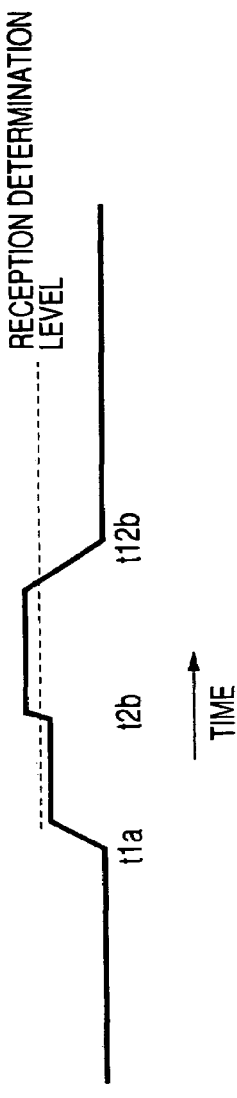
FIG. 17A (Related Art)
FIG. 17B (Related Art)
FIG. 17C (Related Art)
FIG. 17D (Related Art)

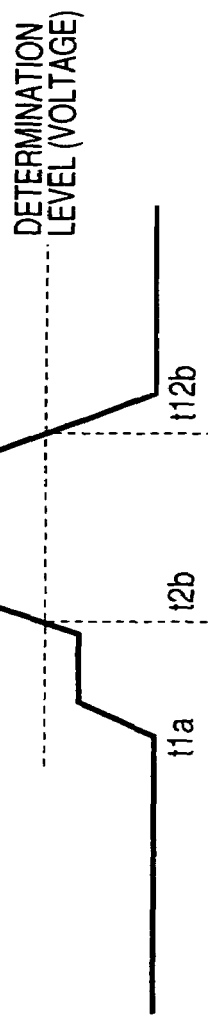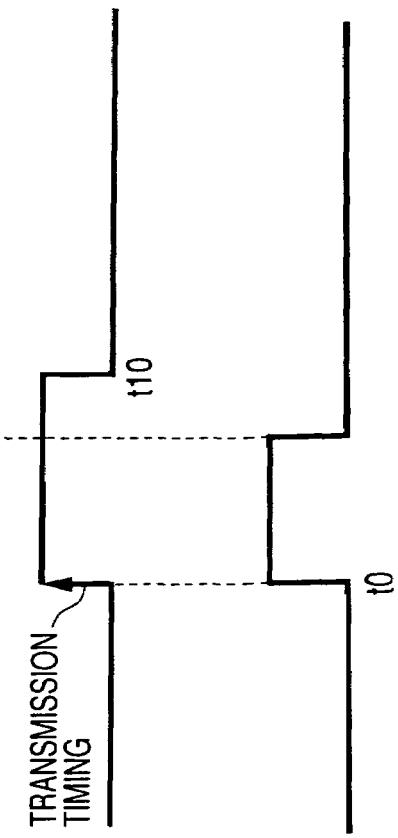
FIG. 18A (Related Art)
FIG. 18B (Related Art)
FIG. 18C (Related Art)
FIG. 18D (Related Art)

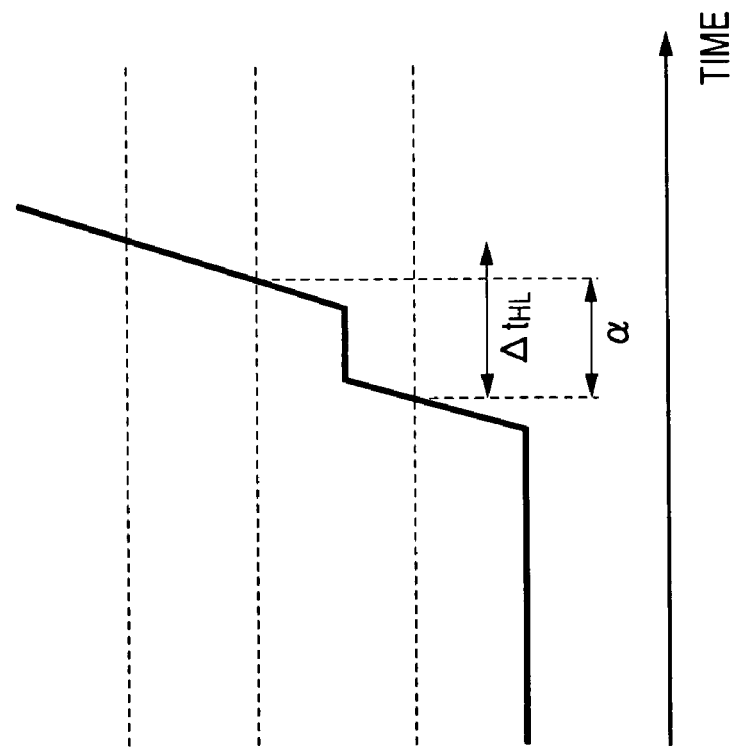
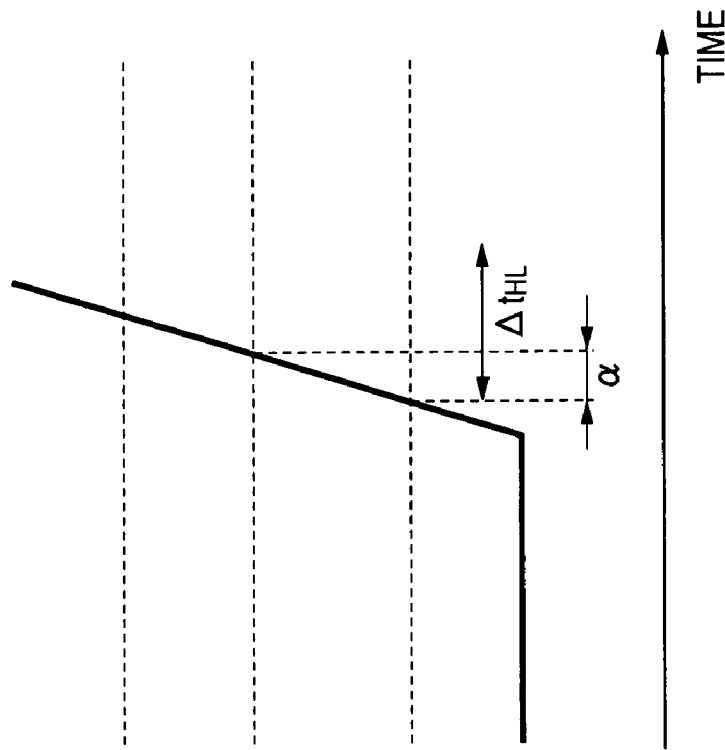

TRANSMISSION-RECEPTION APPARATUS AND OPERATION DETERMINATION METHOD THEREOF

BACKGROUND OF THE INVENTION

1. Field of the Invention

This invention relates to a transmission-reception apparatus, such as a radar, for transmitting a signal to the surrounding space and receiving the signal, and an operation determination method of the transmission-reception apparatus.

2. Description of the Related Art

A radar according to a related art transmits a signal with an electromagnetic wave, an ultrasonic wave, etc., to the surrounding space from a transmission unit 1 having the basic configuration as shown in FIG. 11. The transmission unit 1 transmits a radio wave with a high frequency in a millimeter band from an antenna 2, for example. A transmission section 3 for giving transmission power to the antenna 2 includes an AMP 4 for performing high-frequency power amplification, a modulator 5, and a reference oscillator 6. The modulator 5 modulates a high frequency signal generated in the reference oscillator 6 as a modulated signal and inputs the modulated signal to the AMP 4. A modulation signal transmission timing generation section 7 generates a modulation signal given to the modulator 5.

When receiving the reflection signal of the signal transmitted from the transmission unit 1, the radar having the transmission unit 1 calculates the distance to the reflecting object, etc., based on the time difference between the transmission signal and the reflection signal. To determine whether or not the radar operates normally, the transmission unit 1 and a reception unit need to operate normally. Particularly, for the transmission unit 1, it is also necessary to check that the transmission output power of the transmission signal is within the stipulation in the radio law, etc.

FIG. 12 shows the schematic configuration of a transmission unit 11 whose transmission power can be determined. The transmission unit 11 is based on the transmission unit 1 in FIG. 11 and also has a coupler 12 provided between a transmission section 3 and an antenna 2 for splitting transmission power at one determined ratio. A mixer (MIX) 13 mixes the split transmission power with a high frequency signal generated from a reference oscillator 6, and a demodulation circuit (not shown) demodulates the signal corresponding to a modulation signal. An AD conversion section 14 analog/digital converts the power of the demodulated signal, and a determination section 15 determines the power of the signal. Since the power of the signal input to the determination section 15 has a constant ratio to the transmission power, the transmission power can be calculated based on the ratio. The analog signal level can also be compared with the reference level by a comparator, etc., to determine the transmission power in analog processing. However, the transmission power before arriving at the antenna 2 is split by the coupler 12, and thus if a connection anomaly, etc., occurs in the route of the transmission power from the coupler 12 to the antenna 2, a determination cannot be made.

FIG. 13 shows the schematic configuration of a transmission unit 21 whose operation characteristic also containing an antenna 2 can be checked. The transmission unit 21 includes a reception antenna 22 and a reception section 23 in addition to similar components to those of the transmission unit 1 in FIG. 11. The reception section 23 contains an AMP 24 for high-frequency amplification and a mixer (MIX) 25 for mixing. The MIX 25 mixes a high frequency signal output from the AMP 24 with a high frequency signal from a reference oscillator 6 like the MIX 13 in FIG. 12, and the provided signal is demodulated and the demodulated signal is given to an AD conversion section 14 and a determination section 15. In this configuration, the normal operation of the transmission unit also containing the antenna 2 can be checked, but it is more difficult to place, install, etc., the transmission unit. For example, the reception antenna 22 needs to be placed so that it receives only the signals transmitted from the transmission antenna 2 and moreover does not become an obstacle in the direction in which the radar needs to emit a transmission wave for making a search. The radar also requires a reception unit and therefore the number of installed parts and the cost increase and the configuration also becomes complicated.

FIGS. 14 and 15 show the schematic configurations of general transmission-reception apparatus 31 and 41. Parts identical with or similar to those previously described with reference to FIGS. 11 to 13 are denoted by the same reference numerals in FIGS. 14 and 15 and will not be discussed again. FIG. 14 shows the configuration of the transmission-reception apparatus 31 having the system configuration of transmission and reception in one piece in which a transmission section 3 and a reception section 23 share a reference oscillator 6. Generation of a modulation signal given to a modulator 5 of the transmission section 3 and determination of output from a mixer (MIX) 25 of the reception section 23 are performed by a signal processing section, etc., 32 required depending on the mode. FIG. 15 shows the configuration of the transmission-reception apparatus 41 having the system configuration of transmission and reception in separate pieces. A modulation signal is given to a modulator 5 of a transmission section 3 from a transmission signal processing section, etc., 42 required depending on the mode. A reception section 43 is also provided with a reference oscillator 44. Output from a mixer (MIX) 25 is determined by a reception signal processing section, a detection section, etc., 45 required depending on the mode.

In the transmission-reception apparatus 31, 41, in a case where the system can separate a direct wave and a reflected wave, for example, a case where the frequency of the transmission signal directly received and the frequency of the reception signal are different due to frequency modulation, etc., the reception section 23, 43 can be used to check the operation including the transmission section 3. However, if there is a possibility that the signal of the same frequency may be transmitted over a given time and meanwhile a reflection signal may be received as in a radar adopting a pulse mode, etc., it is necessary to provide a signal processing section and a determination section for determining whether the wave is a reflected wave or a direct wave.

FIG. 16 shows the schematic configuration of a radar 51 adopting the pulse mode. In the radar 51, when the signal transmitted from a transmission antenna 2 is reflected at a target 52, the reflected wave as well as the direct wave from the antenna 2 is received at a reception antenna 22 and therefore the reflected wave and the direct wave need to be separated by some method. A transmission control section 53 generates a transmission modulation signal given to a modulator 5 of a transmission section in a pulse shape to generate the pulse signal transmitted from the antenna 2. The transmission control section 53 generates the pulse-like modulation signal in accordance with the transmission timing given from a system control section 54. The signal taken out from a mixer (MIX) 25 of a reception section 23 is detected by a detection section 55 and is demodulated, and a comparator 56 detects the reception timing of the signal reaching a predetermined reception level. A reception determination section 57 inputs output representing the transmission timing from the system control section 54 and output representing the reception timing from the comparator 56.

To measure the distance to the target 52 with the radar 51, as the transmission operation, the system control section 54 generates the transmission timing and sends the transmission timing to the transmission control section 53 and the reception determination section 57. The transmission control section 53 generates a transmission modulation signal, the modulator 5 modulates the reference oscillation frequency, the AMP 4 amplifies, and the signal is emitted to the space through the antenna 2. As the reception operation, an AMP 24 amplifies the high frequency signal based on the radio wave received through the antenna 22, and the MIX 25 separates the signal into a difference frequency component from the reference oscillation frequency. The detection section 55 converts the difference frequency component into the voltage representing the reception intensity and the comparator 56 determines whether or not the signal is received at a given voltage level or more, and sends the reception timing to the reception determination section 57. The reception determination section 57 determines the distance to one target 52 based on the time difference between the transmission timing sent from the system control section 54 and the reception timing sent from the comparator 56.

FIG. 17A shows a transmission wave, FIG. 17B shows a received direct-wave, FIG. 17C shows a received reflected-wave, and FIG. 17D shows a state in which the direct wave and the reflected wave are combined at the antenna 22 and the later. As shown in FIG. 17A, the transmission wave is generated like a pulse so that transmission of the transmission wave is started at time t0 and is terminated at time t10. However, the time interval between the times t0 and t10 is prolonged relative to the period of a high frequency signal in a millimeter band, for example, and thus the actual waveform becomes a burst wave and the envelope wave form of the burst wave becomes like a pulse. The amplitude of the transmission wave is defined by the transmitter output power from the antenna 2. As shown in FIG. 17B, reception of the direct wave is started at time t1 and is terminated at time t11. The time difference between the times t1 and t0 is determined by the transmission-and-reception antenna spacing between the antennas 2 and 22. The amplitude of the reception signal is determined by the transmission-and-reception antenna spacing between the antennas 2 and 22, an antenna gain pattern, etc. If the reflected wave is received as shown in FIG. 17C, reception start time t2 varies depending on the positional relationship of the target 52. The amplitude of the reflected wave also varies depending on the reflection intensity and the distance of the target 52.

As shown in FIG. 17D, the composite wave rises at time t1a a little delayed from the time t1 and further rises at time t2b a little delayed from the time t2 and falls at time t12b a little delayed from the time t12. Usually, the detection section 55 and the comparator 56 determine that the reflected wave received at a level exceeding the reception level of the direct wave is a wave exceeding the reception determination level, and send the reception timing to the reception determination section 57. Therefore, preferably, essentially, no direct wave should exist. If no direct wave exists, reflected waves received at a lower reception level than the direct wave can also be used and the dynamic range can be taken large. In fact, however, it is difficult to eliminate the direct wave completely, and existence of the direct wave is a factor for limiting the lowest level of the reflected wave that can be determined.

FIGS. 18A to 18D show the basic concept for finding the time difference between transmission and reception using the radar 51 in the pulse mode. FIG. 18A shows the wave form resulting from executing voltage conversion of a composite wave as shown in FIG. 17D by the detection section 55. The comparator 56 makes a comparison using the determination level as the reference, and comparator output as shown in FIG. 18B represents the reception timing. FIG. 18C shows the transmission timing of the transmission control section 53. FIG. 18D shows the transmission and reception time difference. The distance to the target 52 is calculated from the transmission and reception time difference.

An art of suppressing an unnecessary direct wave based on a transmission output, which is input by wire, has also been proposed. (For example, refer to JP-A-Hei.5-341039)

SUMMARY OF THE INVENTION

In the transmission-reception apparatus for performing transmission and reception at the same time such as the radar, direct reception of the transmission wave is not avoided. Although the direct wave can be suppressed as disclosed in JP-A-Hei.5-341039, the number of installed parts and the cost increase and the configuration also becomes complicated.

The inventor thought that reception of a direct wave could be used effectively to determine whether or not a transmission-reception apparatus operated normally as a system.

The invention provides a transmission-reception apparatus for making it possible to easily determine whether or not the apparatus normally operates using a reflected wave effectively, and an operation determination method of the transmission-reception apparatus.

According to a first aspect of the invention, a transmission-reception apparatus includes a transmission section, a reception section, a transmission control section, a signal detection section, and an operation determination section. The transmission section transmits a signal to a surrounding space. The reception section receives the signal from the surrounding space. The transmission control section controls the transmission section to transmit the signal in a pulse shape. The signal detection section which detects level of the signal received by the reception section. The operation determination section determines as to whether or not a timing at which the level of the received signal exceeds a first determination level is within a first time period on the basis of detection result by the signal detection section and a timing at which the transmission control section controls the transmission section to transmit the signal in the pulse shape, to determine as to whether or not the transmission section and the reception section operate normally.

The reception section may have directivity so that the reception section receives the signal, which is directly transmitted from the transmission section, at a lower level than the signal reflected by an object (a target). In this case, even if the reception section receives the signal, which is directly transmitted from the transmission section, this direct signal does not mask the reflected signal because the level of the direct signal is lower than that of the reflected signal.

Also, since a distance to the target is sufficiently longer than a distance between the transmission section and the reception section, there occurs a time difference between a timing at which the reception section receives the direct signal and a timing at which the reception section receives the reflected signal. Therefore, even if an object (the target), which reflects the transmission signal, exists in the surrounding space, the direct signal and the reflected signal can be discriminated using this time difference. The operation determination section uses the direct signal to determine as to whether or not the transmission-reception apparatus operates normally.

According to a second aspect of the invention, the transmission control section controls the transmission section to transmission the signal in the pulse shape in a predetermined transmission period a plurality of times. The operation determination section performs a statistical processing for the detection results from the plurality of transmissions.

Since the statistical processing increases the determination accuracy, the operation determination section can determine more reliably as to whether or not the transmission-reception apparatus operates normally.

According to a third aspect of the invention, the operation determination section determines that the transmission section and the reception section operate normally when the level of the received signal remains between the first determination level and a second determination level within a second time period from a timing at which the level of the received signal exceeds the first determination level.

It is noted that the level of the signal, which directly input from the transmission section to the reception section, corresponds to a transmission power at the transmission section.

According to a fourth aspect of the invention, the second determination level is set so that when the level of the received signal exceeds the second determination level, the transmitted signal is out of a legal range. When the level of the received signal exceeds the second determination level before the second time period has been elapsed, the operation determination section stops the transmission of the transmission section.

The signal reflected by the target is expected to reach the reception section after the second time period has been elapsed. Therefore, when the level of the received signal exceeds the second determination level before the second time period has been elapsed, the level of the direct signal (that is, the transmission power of the transmission section) increases unexpectedly beyond the legal range. The operation determination section stops the transmission of the transmission section. Accordingly, the transmission-reception apparatus of the fourth aspect can stop the transmission of the transmission signal having a power beyond the legal range immediately.

According to a fifth aspect of the invention, an operation determination method determines as to whether or not a transmission-reception apparatus including a transmission section, which transmits a signal to a surrounding space, and a reception section, which receives the signal from the surrounding space. The method includes causing the transmission section to transmit the signal in a pulse shape; comparing level of the signal received by the reception section with a determination level; judging as to whether or not a timing at which the level of the received signal exceeds the determination level is within a predetermined time period on a result of the comparing and a timing of the causing; and determining as to whether or not the transmission section and the reception section operate normally on the basis of a result of the judging.

According to the invention, the transmission-reception apparatus includes the transmission section for transmitting a signal to the surrounding space and the reception section for receiving a signal from the surrounding space. The reception section is set so as to receive the signal transmitted when the transmission section is in the normal operation state at the predictive level lower than the level expected to be the level receiving the reflection signal of the transmission signal. Thus, if the transmission signal is directly received, the predictive level of the signal level is lower than the level expected to be the level receiving the reflection signal and the direct wave does not become an obstacle to reception of the reflection signal higher than the predictive level.

Further, when the transmission section is caused to transmit a pulse-like signal, the level of the signal received by the reception section is detected. A response is made to the level detection result of the signal. If the timing detected as the signal level exceeds the determination level precedes the predictive timing at which the reflection signal of the signal transmitted from the transmission section will be received based on the timing for the transmission control means to control the transmission section so as to transmit the pulse-like signal in response to the determination result of the signal detection means, it can be determined that the reception signal is the signal transmitted from the transmission section and received directly by the reception section and the transmission section and the reception section operate normally. If an object reflecting the transmission signal exists in the surrounding space, the transmission signal and the direct reception signal are separated based on the time difference by the time the signal is received as reflection signal, and it can be determined that the transmission-reception apparatus normally operates based on the direct reception signal.

BRIEF DESCRIPTION OF THE DRAWINGS

FIGS. 4A to 4E are time charts to show the operation in a second embodiment of the invention.

FIG. 7 shows an example of the statistical processing result in the radar 91 in FIG. 5.

FIG. 8 is a block diagram to show the schematic electric configuration of a radar 101 according to a third embodiment of the invention.

FIGS. 9A to 9H are time charts to show the operation of the main part of the radar 101 according to the third embodiment of the invention.

FIGS. 10A to 10H are time charts to show the operation of the main part of the radar 101 according to the third embodiment of the invention.

FIGS. 17A to 17D are time charts to show signals processed in FIG. 16.

FIGS. 18A to 18D are time charts to show signals processed in FIG. 16.

FIG. 22A shows an example where α is shorter than $\Delta t_{HL}$; and FIG. 22B shows an example where the composite wave increases linearly beyond a direct-wave detection level H.

DETAILED DESCRIPTION OF THE PREFERRED EMBODIMENT

First Embodiment

Figure 1:
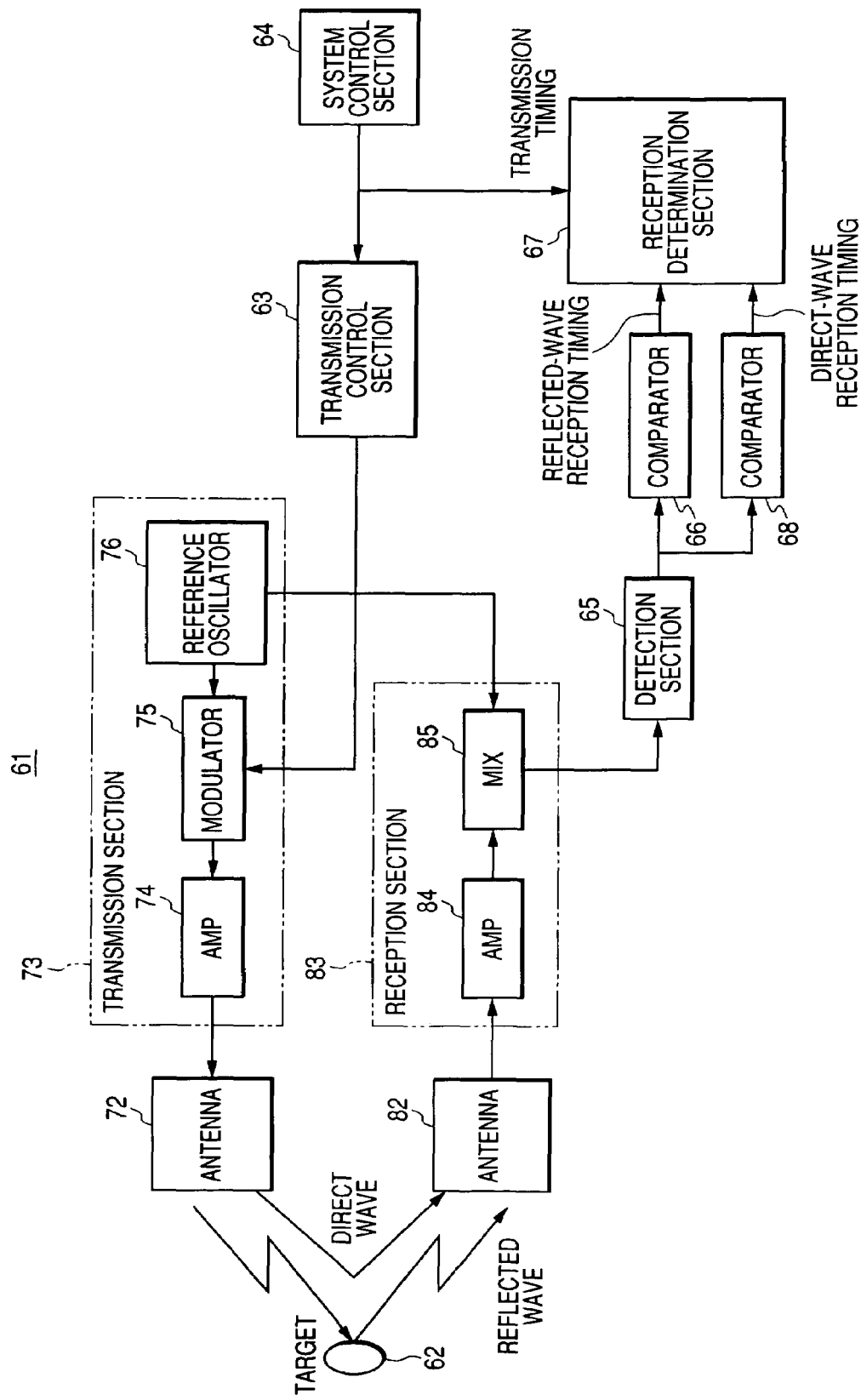
FIG. 1 is a block diagram to show the schematic electric configuration of a radar 61 according to a first embodiment of the invention.

FIG. 1 shows the schematic electric configuration of a radar 61 as a transmission-reception apparatus according to a first embodiment of the invention. The radar 61 emits a radio wave to the surrounding space and receives the reflected wave at a target 62. The transmission signal is formed into a pulse shape on the basis of a transmission modulation signal generated by a transmission control section 63. If the radar 61 searches for the target 62 in a pulse mode, the radar 61 can be used with the original configuration. If the radar 61 searches for the target 62 in any other mode than the pulse mode, the mode can be switched to the pulse mode only when the operation is checked to see if the radar 61 operates normally.

A system control section 64 determines the transmission timing. To determine the reception timing, the radar 61 includes a detection section 65, a comparator 66 for detecting the reflected-wave reception timing, a reception determination section 67, and a comparator 68 for detecting the direct-wave reception timing.

A transmission section 73 includes an AMP 74, a modulator 75, and a reference oscillator 76 so as to transmit a transmission wave from a transmission antenna 72. A reference oscillation signal generated by the reference oscillator 76 is input to a modulator 75 as a signal to be modulated and is modulated by a transmission modulation signal from the transmission control section 63. The AMP 74 amplifies power of the signal and the signal is sent to the antenna 72. When the signal transmitted from the antenna 72 is reflected at the target 62, the reflected wave as well as the direct wave from the antenna 72 is received at a reception antenna 82. The pulse transmission signal transmitted from the antenna 72 is generated on the basis of the transmission modulation signal given to the modulator 75 of the transmission section 73 by the transmission control section 63. The transmission control section 63 generates the pulse transmission modulation signal in accordance with the transmission timing given from the system control section 64.

An AMP 84 of a reception section 83 amplifies the signal received at the antenna 82 is amplified. A mixer (MIX) 85 mixes the amplified signal with the reference oscillation signal. The detection section 65 detects the signal taken out from the mixer (MIX) 85 to demodulate the signal. The comparator 66 detects the reflected-wave reception timing reaching a predetermined reception level. The reception determination section 67 inputs an output representing the transmission timing from the system control section 64 and an output representing the reception timing from the comparator 66. The radar 61 further includes a comparator 68, which detects the direct-wave reception timing. Reception of the direct wave is started at the time with a delay of the time defined by the antenna distance between the transmission antenna 72 and the reception antenna 82 from the transmission start time of the transmission signal. The comparator 68 checks as to whether or not the direct wave is received at the defined timing. The reception determination section 67 determines the distance to one target 62 on the basis of the time difference between the transmission timing sent from the system control section 64 and the reflected-wave reception timing sent from the comparator 66. The reception determination section 67 confirms the operation of the radar 61 using the direct-wave reception timing.

Figure 2:
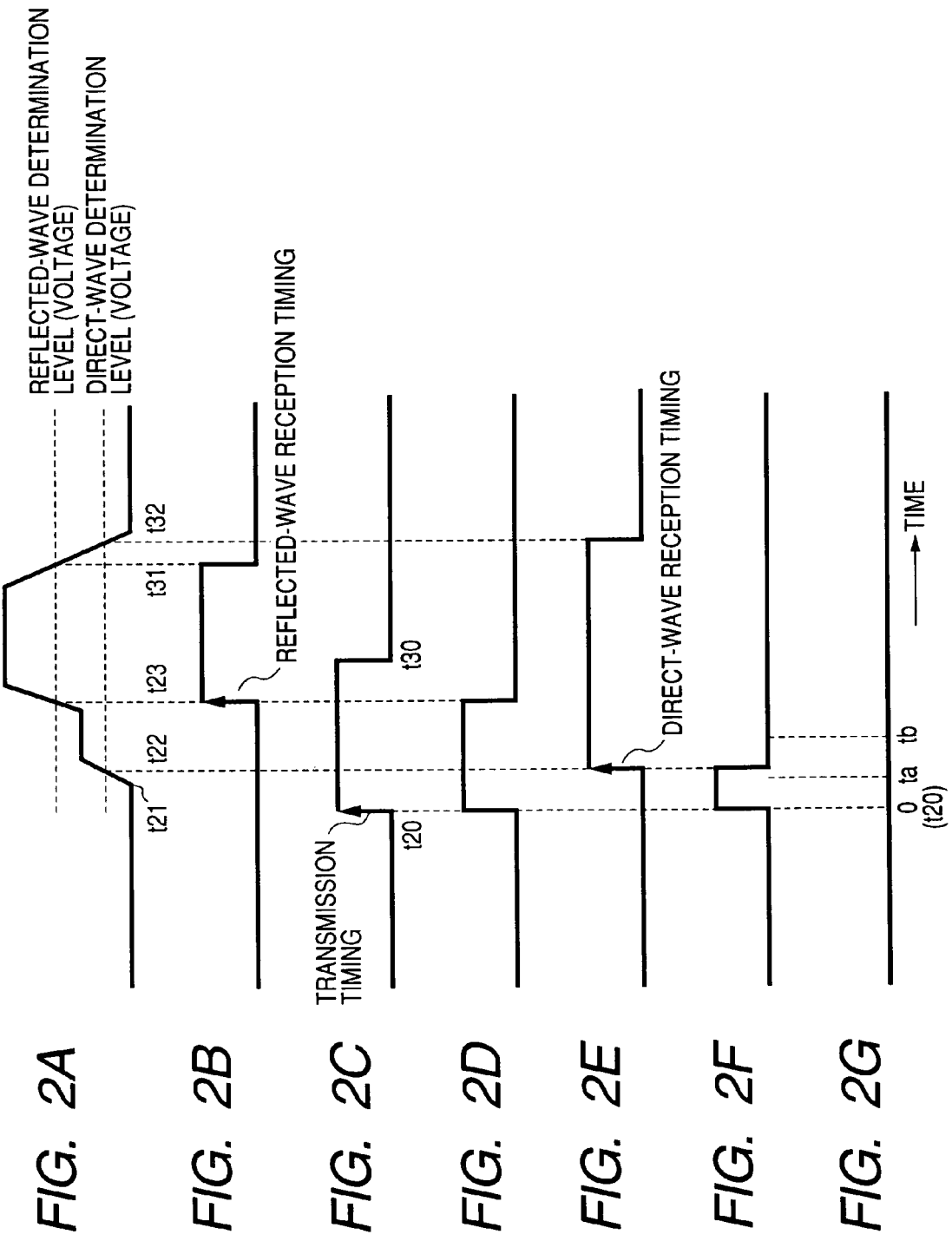
FIGS. 2A to 2F are time charts to show operation of the main part of the radar 61 according to the first embodiment of the invention.

FIG. 2A shows a state in which the direct wave and the reflected wave are combined at the antenna 82 and the later steps. This composite wave is basically equal to that in FIG. 18A. However, the reflected-wave determination level corresponding to the determination level in FIG. 18A is set in the comparator 66 and the direct-wave determination level lower than the reflected-wave determination level is set in the comparator 68. The reflected-wave determination level is set to a level at which the direct wave does not reach in the normal operation state. As shown in FIG. 2A, the composite wave rises at time t21, reaches the direct-wave determination level at time t22, and further reaches the reflected-wave determination level at time t23. The composite wave falls below the reflected-wave determination level at time t31 at which the reception of the reflected wave has been terminated, and falls below the direct-wave determination level at time t32.

FIG. 2B shows the reflected-wave reception timing. The comparator 66 detects that the composite wave exceeds the reflected-wave determination level during the time period from the time t23 to the time t31. FIG. 2C shows the transmission timing. Transmission is started at time t20 and high frequency signal is transmitted like a burst to time t30. FIG. 2D shows the time difference between the transmission wave and the reflected wave. This time difference corresponds to the distance between the radar 61 to the target 62. FIG. 2E shows the time period, which the comparator 68 detects as the direct-wave reception timing. This time period corresponds to the time period during which the composite wave exceeds the direct-wave determination level in FIG. 2A. FIG. 2F shows the time difference between the transmission and reception of the direct wave. This time difference corresponds to the distance between the transmission antenna 72 and the reception antenna 82, as described above.

Even the pulse-like signal generated during a sufficiently short time period from time 20 to time 30 is prolonged relative to the period of a high frequency signal in a millimeter band, for example. Thus, the actual waveform becomes a burst wave, of course.

Figure 3:
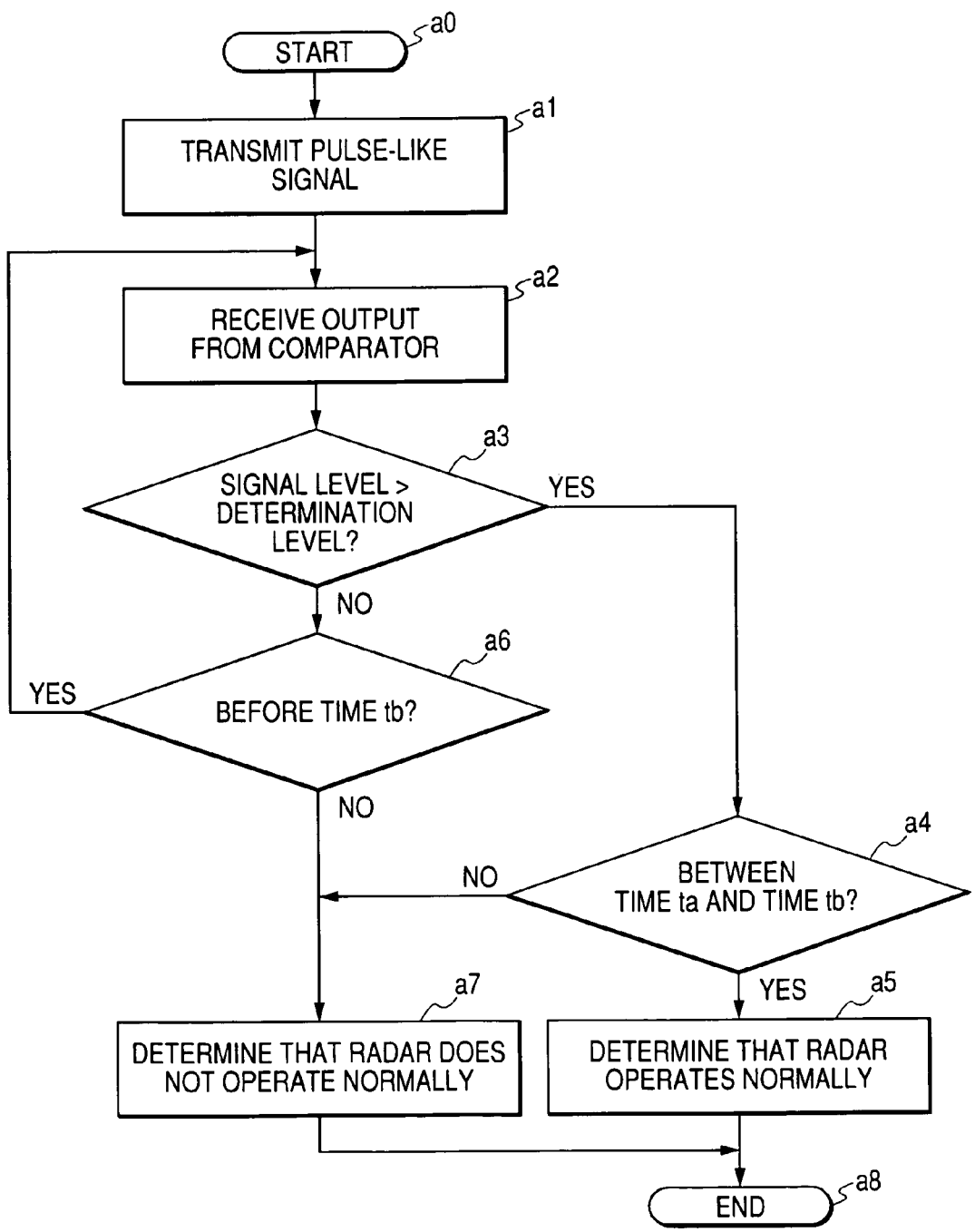
FIG. 3 is a flowchart to show a schematic procedure for determining whether or not the radar 61 according to the first embodiment of the invention operates normally.

FIG. 3 shows a schematic procedure for determining whether or not the radar 61 in FIG. 1 operates normally. The procedure is started at step a0. The antenna 72 transmits the pulse-like signal in accordance with the transmission timing generated by the system control section 64. At step a1, when the reception determination section 67 receives the transmission timing from the system control section 64, the reception determination section 67 turns on a timer (not shown). Then, the antenna 82 receives signals. The reception determination section 67 receives outputs from the comparators 66, 68 at step a2. At step a3, it is determined as to whether or not the reception determination section 67 receives the direct-wave reception timing from the comparator 68. In other words, it is determined as to whether or not the composite wave exceeds the direct-wave determination level. If the determination at step a3 is yes, the procedure proceeds to step a4. If no, the procedure proceeds to step a6.

By the way, the distance between the antenna 72 and the antenna 82 has been known. Therefore, it has also been known how long does it take that the direct wave propagates from the antenna 72 to the antenna 82. The reception determination section 67 stores in advance a predetermined time period within which the reception determination section 67 is expected to receive the direct-wave reception timing from the comparator 68. Specifically, the reception determination section 67 stores time ta and time tb shown in FIG. 2G. It is noted that in FIG. 2G, the time ta, tb are measured from the time t20 at which the reception determination section 67 receives the transmission timing.

At step 4, it is determined on the basis of the timer as to whether or not the reception determination section 67 receives the direct-wave reception timing within the predetermined time period between the time ta and the time tb. If yes, the procedure proceeds to step a5 and it is judged that the radar 61 operates normally. If no, the radar 61 emits an abnormal signal and thus, it is judged that the radar 61 does not operate normally at step 7. After the step a5 or the step a7, the procedure is terminated at step a8.

At step a6, it is determined as to whether or not the timer indicates time before the time tb. If yes, the procedure returns to the step a2. If no, the antenna 82 does not receive the direct wave between the transmission timing and the time tb and thus, it is judged at the step a7 that the radar 61 does not operate normally.

That is, the radar 61 of the embodiment is the transmission-reception apparatus including the transmission section 73 for transmitting a signal to the surrounding space and the reception section 83 for receiving a signal from the surrounding space. The reception section 83 is set so as to receive a signal transmitted when the transmission section 73 is in the normal operation state at the predictive level lower than the level expected to be the level receiving the reflection signal of the signal. The radar 61 includes the transmission control section 63 of the transmission control means for controlling the transmission section so as to transmit a pulse-like signal; the comparator 68 of the signal detection means for detecting the level of the signal received by the reception section 73; and the reception determination section 67 of the operation determination means, if the timing detected as the signal level exceeds the determination level precedes the predictive timing at which the reflection signal of the signal transmitted from the transmission section 73 will be received based on the timing for the transmission control means to control the transmission section 73 so as to transmit the pulse-like signal in response to the determination result of the signal detection means, the reception determination section 67 of the operation determination means for determining that the signal is the signal transmitted from the transmission section 73 and received directly by the reception section 83 and the transmission section 73 and the reception section 83 operate normally.

The reception section 83 is set so as to receive the signal transmitted when the transmission section 73 is in the normal operation state at the predictive level lower than the level expected to be the level receiving the reflection signal of the transmission signal with the direction of the antenna 82, etc., adjusted. Thus, if the transmission signal is directly received, the predictive level of the signal level is lower than the level expected to be the level receiving the reflection signal and the direct wave does not become an obstacle to reception of the reflection signal higher than the predictive level. If an object such as the target 62 reflecting the transmission signal exists in the surrounding space, the transmission signal and the direct reception signal are separated based on the time difference by the time the transmitted pulse-like signal arrives, is reflected, and is received as reflection signal, and it can be determined that the transmission-reception apparatus normally operates based on the direct reception signal.

In place of the comparators 66, 68, the radar 61 may include AD converters and the reception determination section 67 may determines the reflected-wave reception timing and the direct-wave reception timing simultaneously. However, in this case, processing load on the reception determination section 67 increases.

Second Embodiment

Figure 4E:
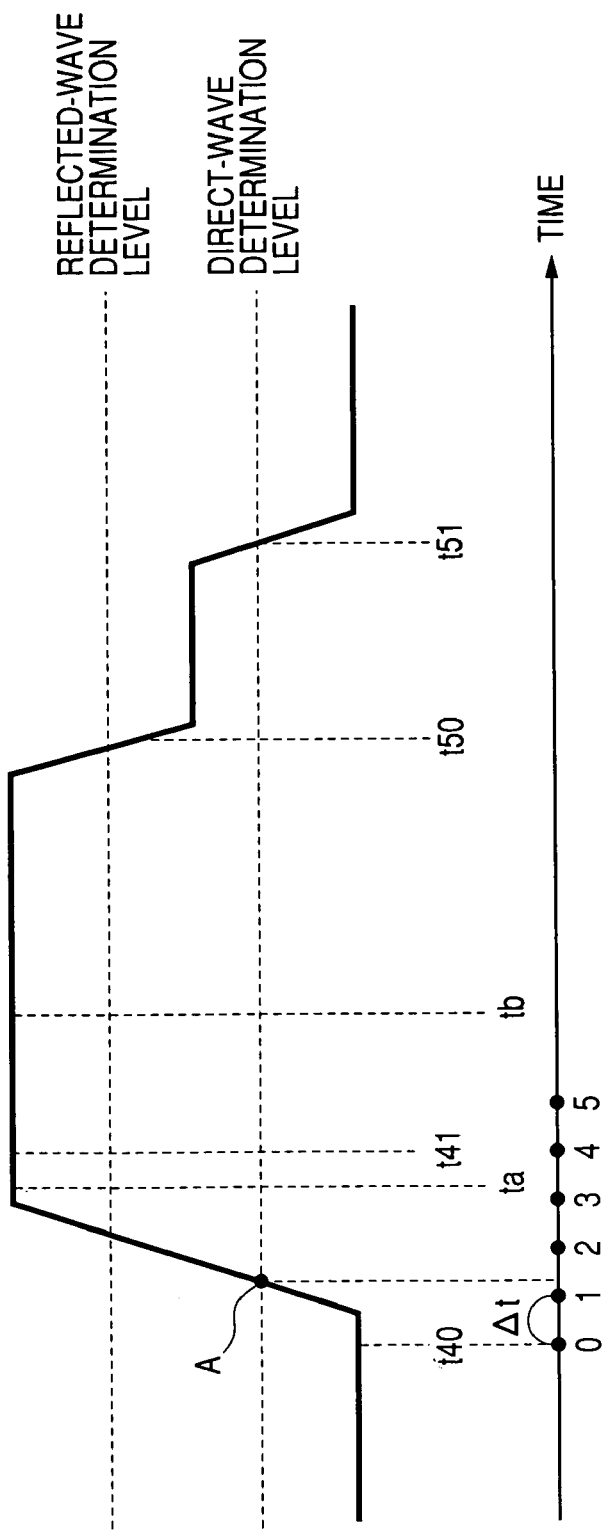

A second embodiment adopts a concept for transmitting pulse-like signals plural times and processing the received signals in a statistical manner to determine as to whether or not a radar operates normally. FIG. 4A shows a transmission wave; FIG. 4B shows a direct wave; FIG. 4C shows a reflected wave; FIG. 4D shows a composite wave; and FIG. 4E shows an enlarged view of a part of FIG. 4D. In a radar operating in the pulse mode, generally transmission is repeated with a given period. Specifically, the pulse transmission is repeated with the transmission period T as shown in FIG. 4A. However, a case may occur where the reflected signal of the signal transmitted between the times t20 and t30 in the preceding period is received after transmission of the next pulse-like signal is started at the time t40. If the reflected wave thus comes back beyond the transmission period, it is necessary to determine a composite signal at an unexpected timing. In FIG. 4, the reflected wave resulting from the transmission wave between time t20 and time t30 masks the greater part of the direct wave. Therefore, if the radar 61 of the first embodiment is used, the comparator 68 determines a point A shown in FIG. 4E to be the direct-wave reception timing. However, since the point A is before the time ta, it is judged at the step a7 of FIG. 3 that the radar 61 of the first embodiment does not operate normally. The unexpected delay of the reflected wave causes the incorrect determination. In such a case, a statistical processing for the direct-wave reception timings obtained is effective to determine as to whether or not a radar operates normally. The statistical processing will be described below in detail.

Figure 5:
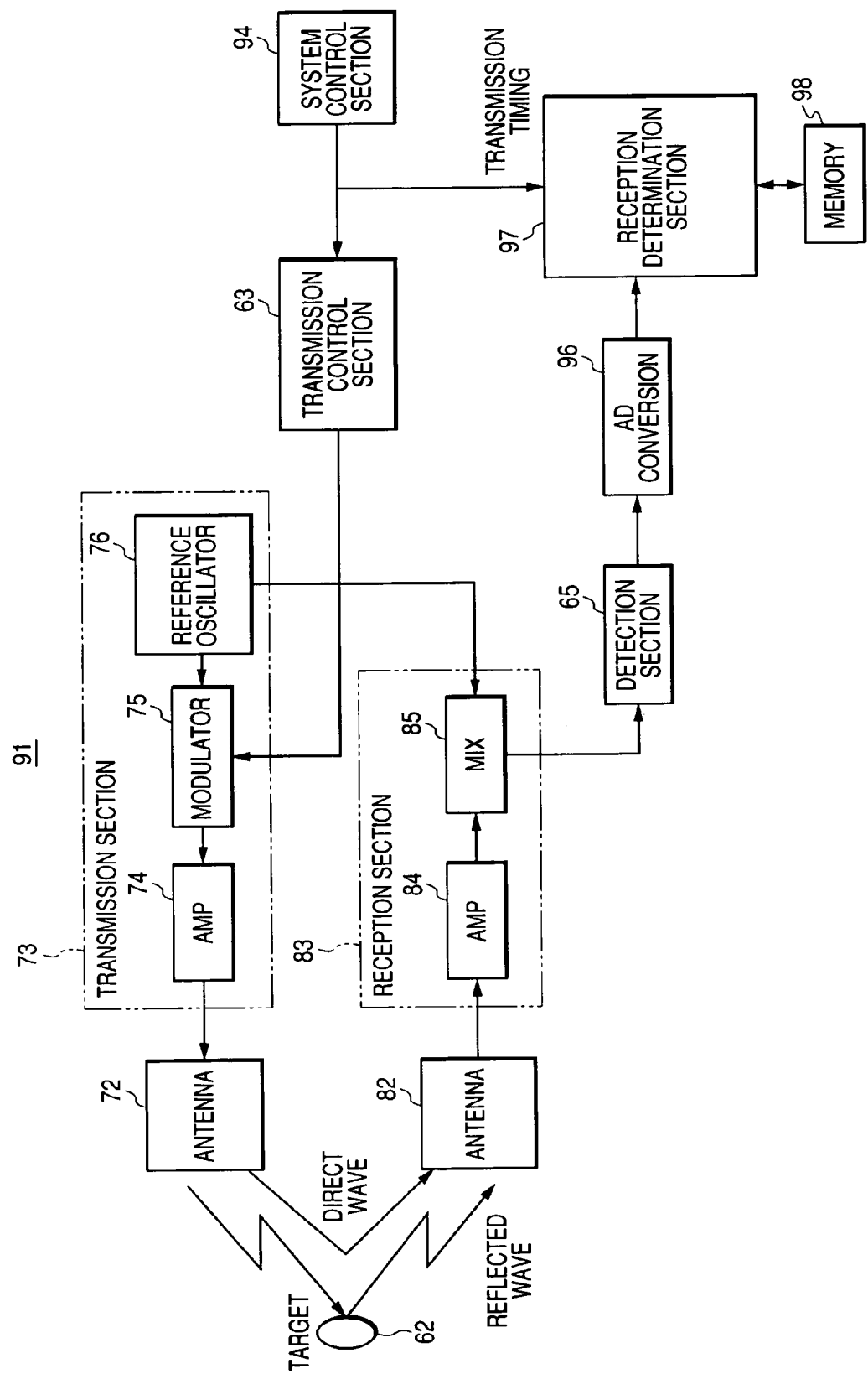
FIG. 5 is a block diagram to show the schematic electric configuration of a radar 91 for performing the operation in FIG. 4.

FIG. 5 shows the schematic configuration of a radar 91 according to the second embodiment of the invention. Parts identical with or similar to those previously described with reference to FIG. 1 are denoted by the same reference numerals in FIG. 5 and will not be discussed again. In the radar 91, a system control section 94 gives the transmission timing to a transmission control section 63 so as to repeat transmission. An AD conversion section 96 converts an analogue voltage of the reception signal decoded by the detection section 65 into a digital value at each predetermined interval Δt (see FIGS. 4E and 19). A reception determination section 97 may store the digital value provided by AD conversion section 96 at each transmission timing in memory 98.

Figure 6:
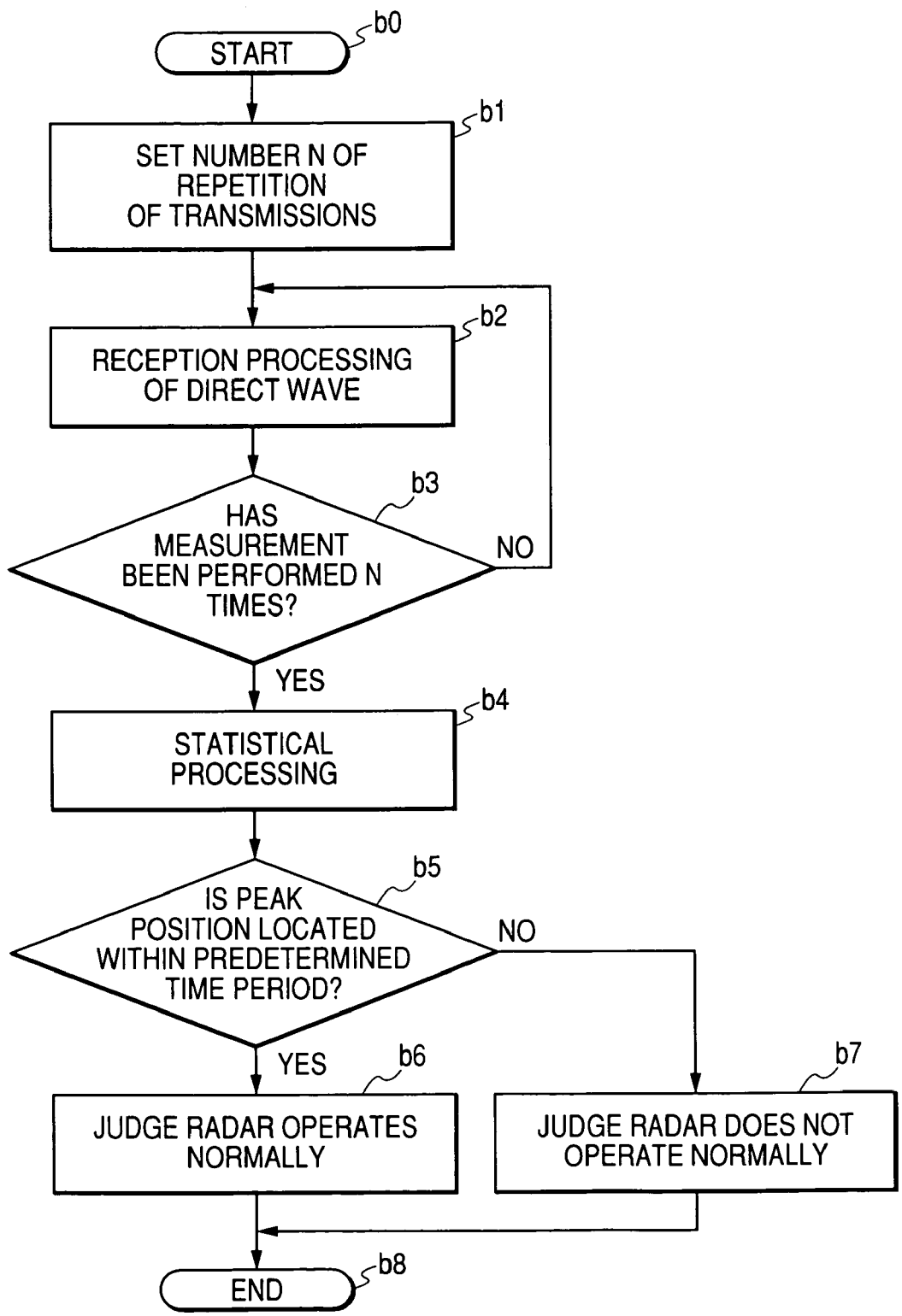
FIG. 6 is a flowchart to show a schematic procedure for determining whether or not the radar 91 in FIG. 5 operates normally.
Figure 11:
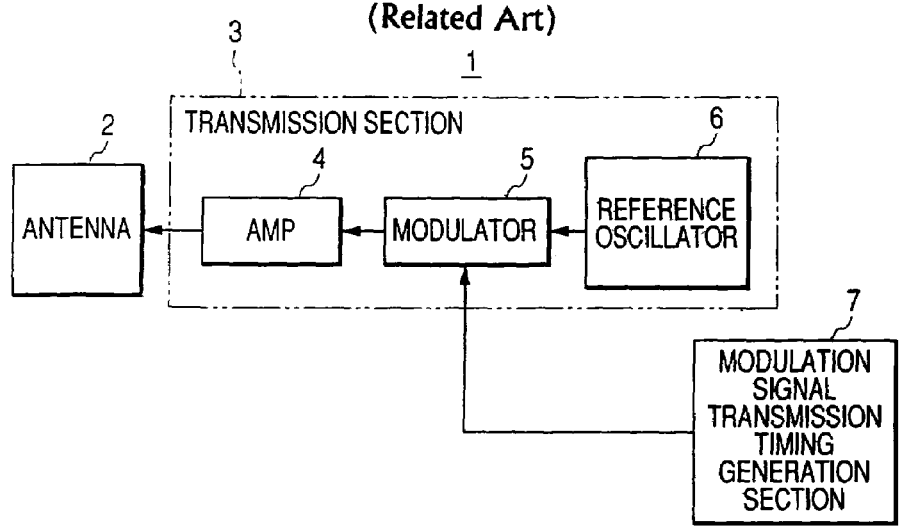
FIG. 11 is a block diagram to show the schematic basic configuration of a transmission unit 1 according to a related art.
Figure 12:
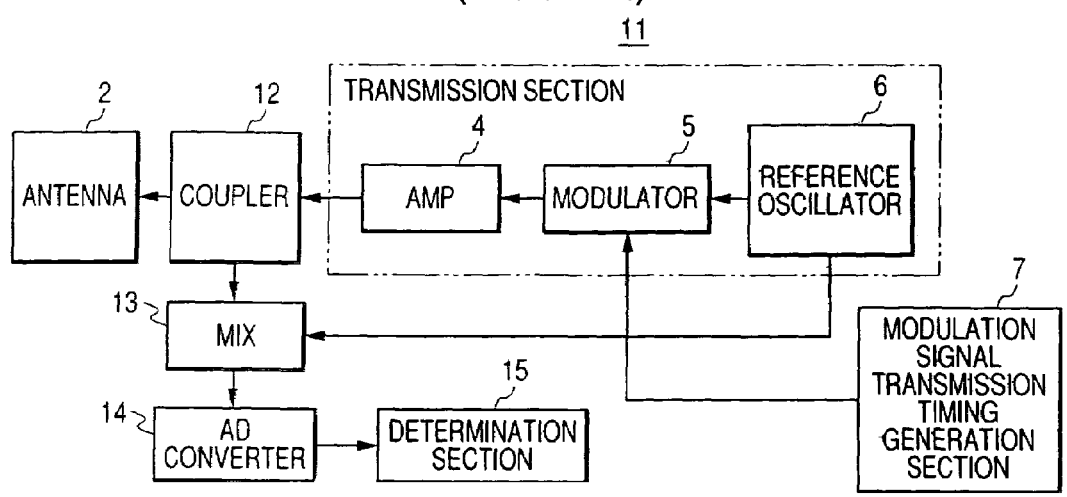
FIG. 12 is a block diagram to show the configuration to check output in a transmission unit 11 according to a related art.
Figure 13:
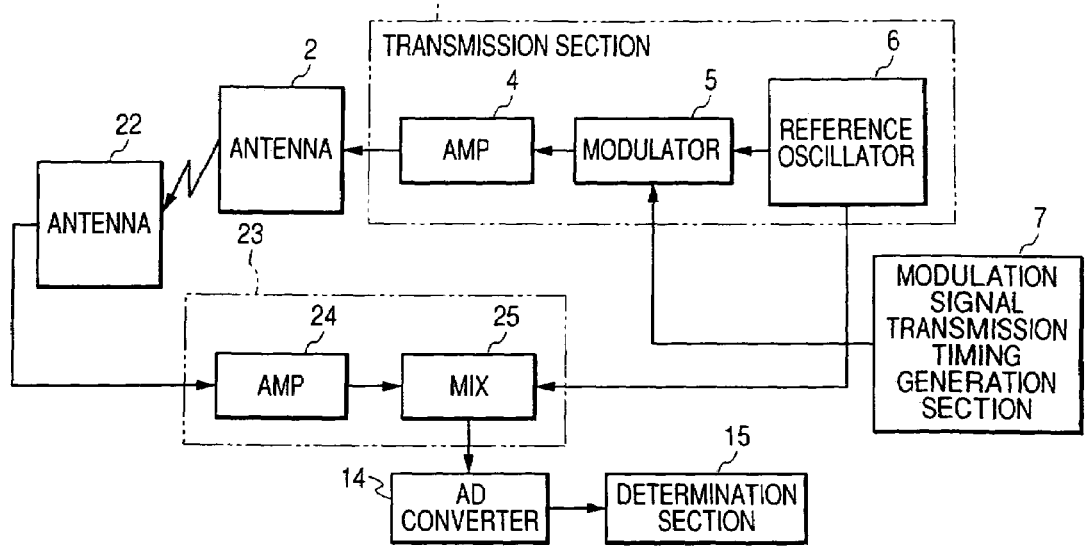
FIG. 13 is a block diagram to show the configuration to check output in a transmission unit 21 according to a related art.
Figure 14:
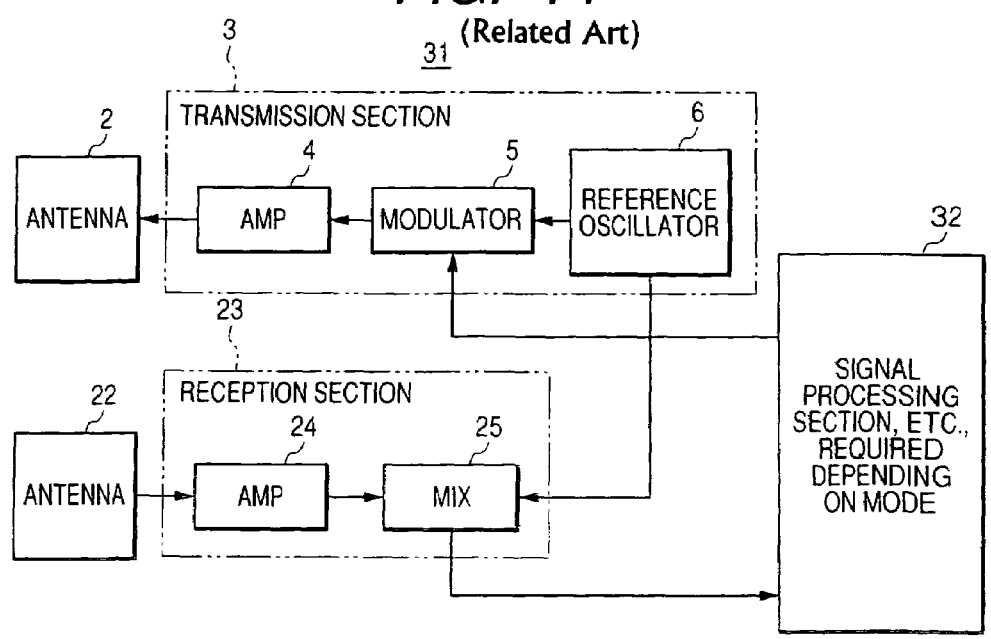
FIG. 14 is a block diagram to show the schematic configuration of a transmission-reception apparatus 31 according to a related art.
Figure 15:
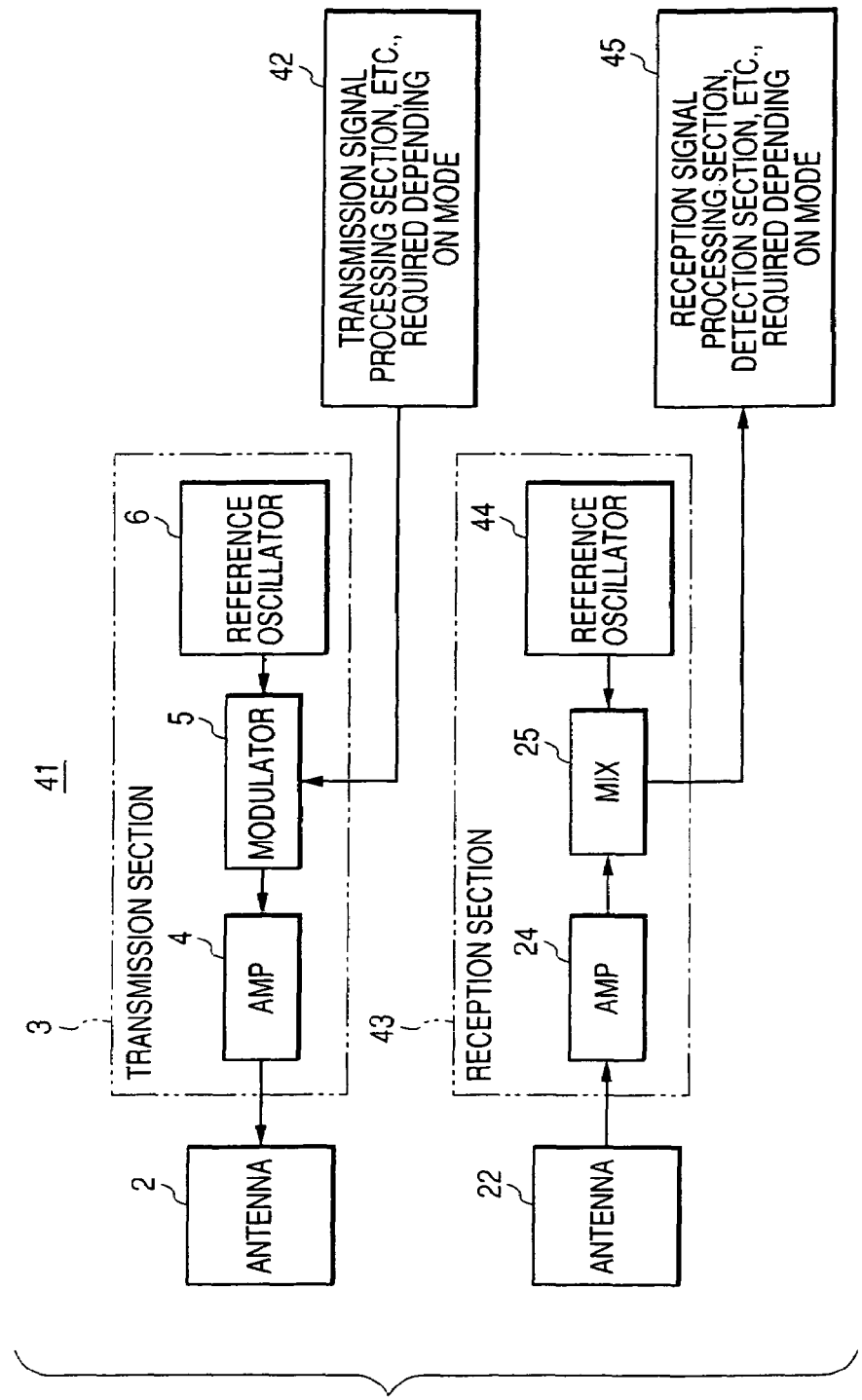
FIG. 15 is a block diagram to show the schematic configuration of a transmission-reception apparatus 41 according to a related art.
Figure 16:
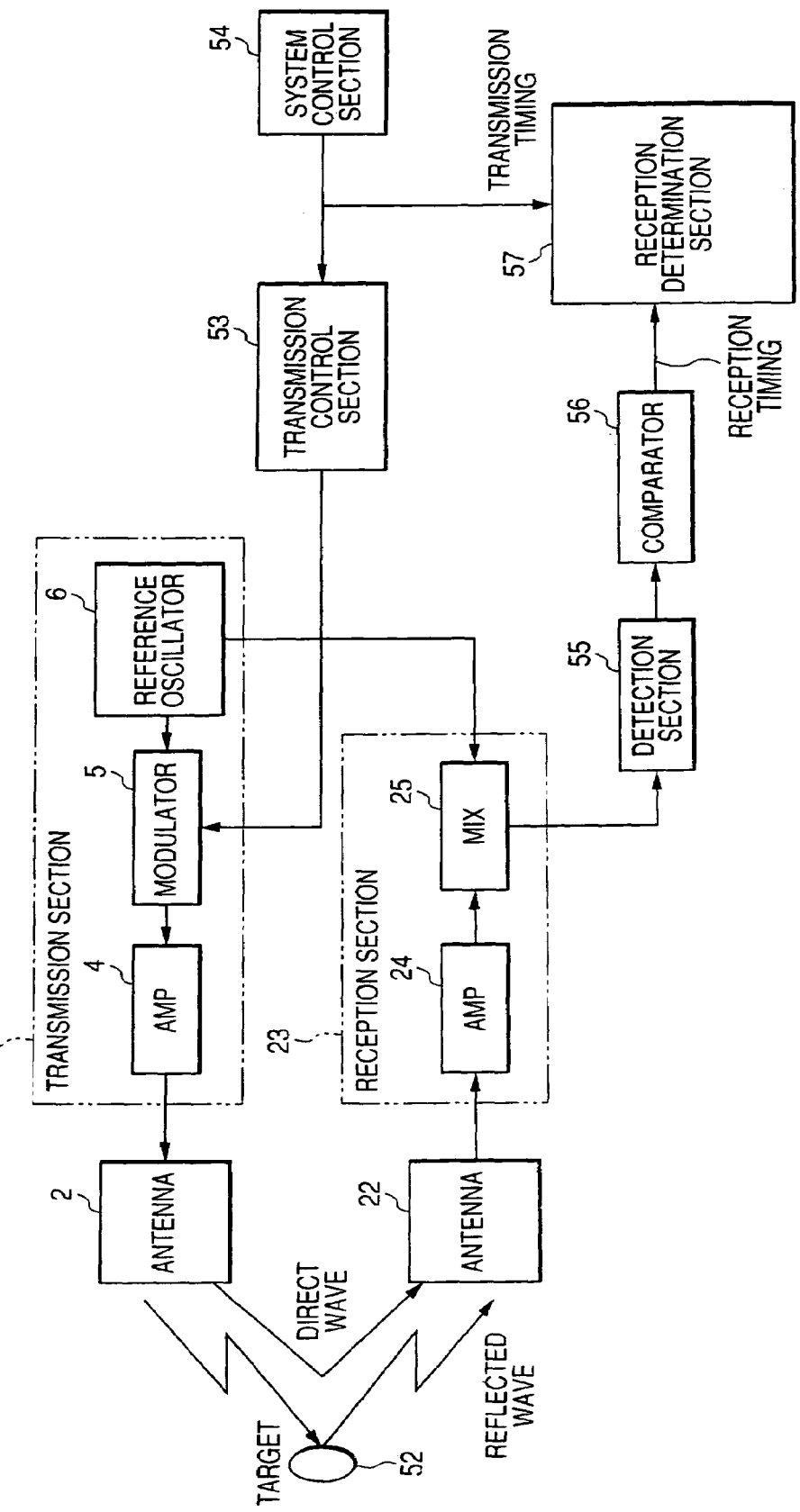
FIG. 16 is a block diagram to show the schematic electric configuration of a radar 51 adopting a pulse mode according to a related art.
Figure 19:
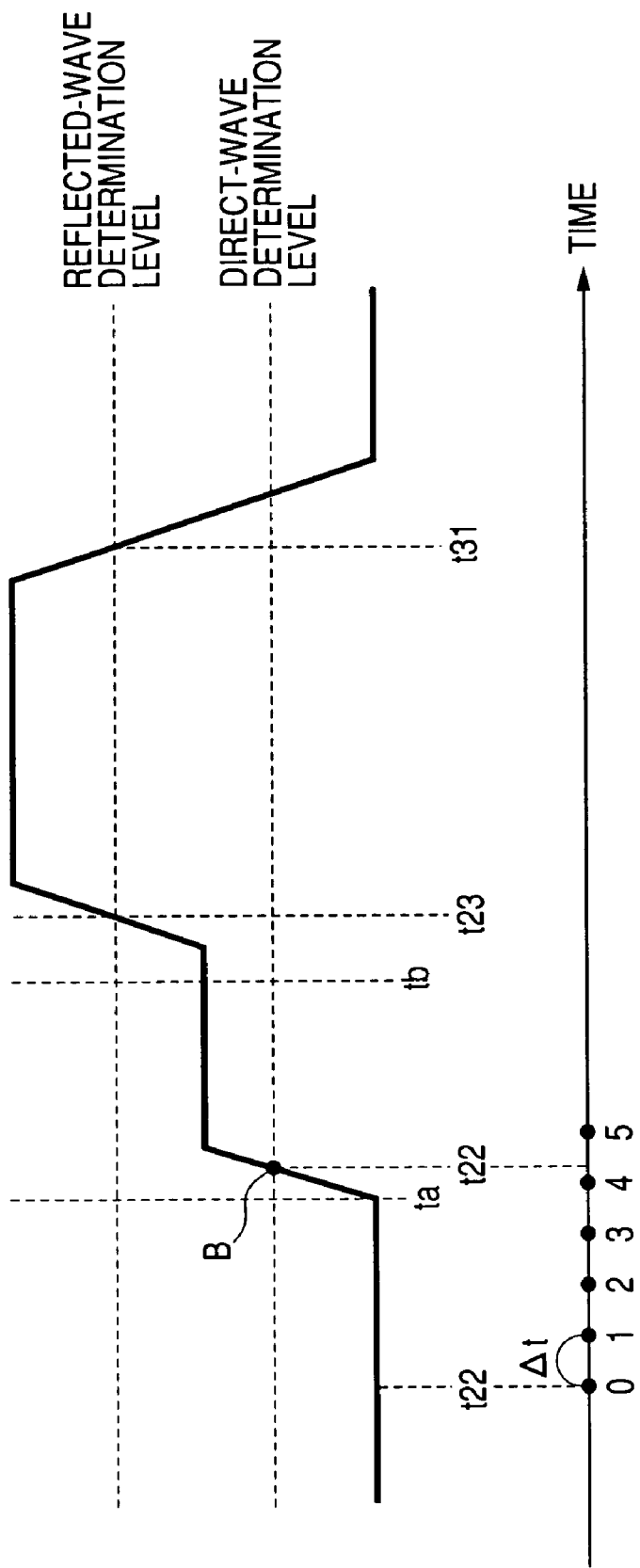
FIG. 19 is an enlarged view of FIG. 2A.

FIG. 6 shows a schematic determination procedure in the second embodiment. The procedure begins at step b0. The number of repetition of the transmissions, n, is set at step b1. Reception processing of a direct wave described as follows is performed at step b2. Upon receiving the transmission timing from the system control section 94, the reception determination section 97 begins to compare the digital value provided by the AD conversion section 96 with the direct-wave determination level. If the reception determination section 97 determines that the digital value exceeds the direct-wave transmission level, the reception determination section 97 stores time i (i×Δt) into the memory 98. FIGS. 4E and 19 show enlarged views of FIGS. 4D and 2A, respectively. For example, the reception determination section 97 stores into the memory 98 time "2" in FIG. 4E, and time "5" in FIG. 19. At step b3, it is determined as to whether or not the step b2 has been performed n times. If no, the procedure returns to the step b2.

If it is determined at b3 that the step b2 has been repeated n times, statistical processing is performed at step b4. Specifically, the reception determination section 97 generates frequency distribution as shown in FIG. 7. In FIG. 7, the ordinate axis indicates number of times and the abscissa axis indicates time. Then, at step b5, it is determined as to whether or not a peak position of the frequency distribution is located within the predetermined time period between the time ta and the time tb. In the case of FIG. 7, the frequency distribution takes the peak at time "5" (5×Δt). If yes at the step b5, since the radar 91 receives the direct wave within the expected time period, the reception determination section 97 judges that the radar 91 operates normally at step b6. If no, the reception determination section 97 judges at step b7 that the radar 91 does not operate normally. Then, the procedure is terminated at step b8.

That is, in the second embodiment, the transmission control section 63 controls the transmission section 73 so as to transmit a pulse-like signal n times in the transmission period T in accordance with the transmission timing from the system control section 94. The reception determination section 97 performs the statistical processing for the n direct-wave detection results. In FIG. 7, the effect of the reflected wave coming back beyond the transmission period T is observed (from time "1" to time "3"), but the peak at time "5" is found clearly. Therefore, even if delay of the reflected wave occurs once or twice due to some reasons (for example, the building far from the vehicle reflects the transmission wave), the reception determination section 97 can determine at high accuracy as to whether or not the radar 91 operates normally.

Third Embodiment

FIG. 8 shows the schematic configuration of a radar 101 according to a third embodiment of the invention. Parts identical with or similar to those previously described with reference to FIG. 1 are denoted by the same reference numerals in FIG. 8 and will not be discussed again. In the third embodiment, a reception determination section 107 sets an upper limit and a lower limit of a direct-wave determination level (that is, a direct-wave determination level H and a direct-wave determination level L). The radar 101 includes comparators 108 and 109, which compares the signal decoded by the detection section 65 with the direct-wave determination level L and the direct-wave determination level H, respectively.

FIGS. 9A to 9H show the operation waveforms in FIG. 8. FIG. 9A shows a composite wave, which is subject to the voltage conversion by the detection section 65. FIG. 9B shows an output of the comparator 66. When the composite wave exceeds the reflected-wave determination level, the comparator 66 outputs the ON signal. FIG. 9C shows the transmission timing provided by the system control section 64. Transmission is started at time t40 and is terminated at time t50. FIG. 9D shows time difference between the transmission timing and a reflected-wave reception timing. FIG. 9E shows an output of the comparator 108. When the composite wave exceeds the direct-wave determination level L, the comparator 108 outputs the ON signal. FIG. 9F shows an output of the comparator 109. When the composite wave exceeds the direct-wave determination level H, the comparator 109 outputs the ON signal. FIG. 9G shows time difference between the transmission timing and the direct-wave reception timing on the basis of the direct-wave determination level L. FIG. 9H shows time difference between the transmission timing and the direct-wave reception timing on the basis of the direct-wave determination level H.

Figure 20:
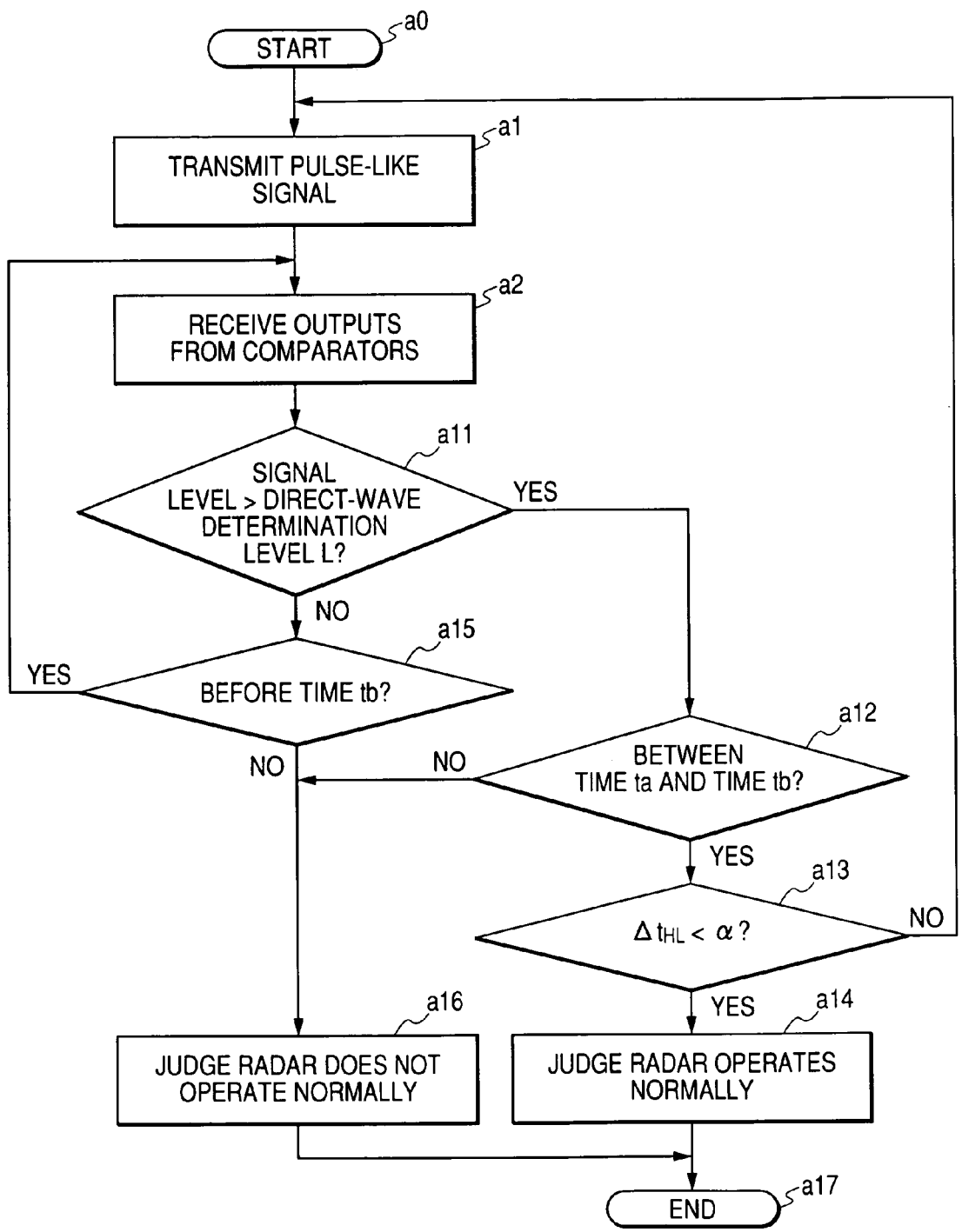
FIG. 20 shows a procedure for determining as to whether or not a radar 101 of the third embodiment operates normally.

FIG. 20 shows a procedure for determining as to whether or not the radar 101 operates normally. The procedure begins with the step a0. At step a1, when the reception determination section 107 receives the transmission timing from the system control section 64, the reception determination section 107 turns on a timer (not shown). Then, the antenna 82 receives signals. The reception determination section 107 receives outputs from the comparators 66, 108, 109 at step a2. At step a11, it is determined as to whether or not the reception determination section 107 receives the direct-wave reception timing from the comparator 108. In other words, it is determined as to whether or not the composite wave exceeds the direct-wave determination level L. If the determination at step a11 is yes, the procedure proceeds to step a12. If no, the procedure proceeds to step a15. The reception determination section 107 stores the time ta and the time tb in advance as with the first embodiment.

Figure 21:
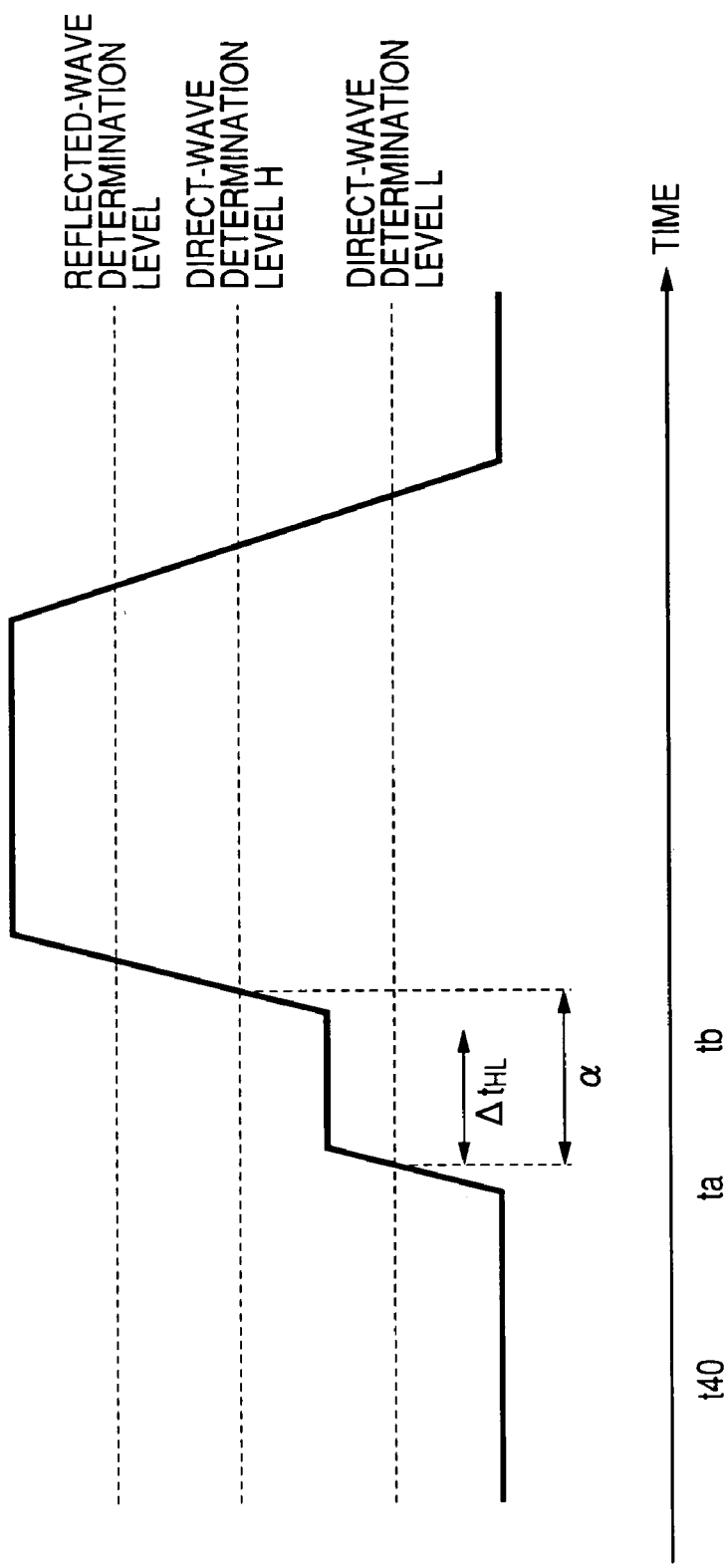
FIG. 21 is an enlarged view of FIG. 9A.

At step a12, it is determined on the basis of the timer as to whether or not the reception determination section 107 receives the direct-wave reception timing from the comparator 108 within the predetermined time period between the time ta and the time tb. If no, the radar 101 emits an abnormal signal and thus, it is judged that the radar 101 does not operate normally at step 16. If yes at the step a12, then the reception determination section 107 compares a predetermined time period $\Delta t_{HL}$ with time difference α between the direct-wave reception timing provided by the comparator 108 and the direct-wave reception timing provided by the comparator 109 (step a13). In other words, it is determined as to whether or not $\Delta t_{HL} < \alpha$. FIG. 21 is an enlarged view of FIG. 9A. When the radar 101 operates normally and the radar 101 receives the reflected wave by the target 62, α should be larger than $\Delta t_{HL}$. Since the target 62 is located sufficiently far from the vehicle in comparison with the distance between the antennas 72, 82, the reflected wave should delay with respect to the direct wave for at least $\Delta t_{HL}$. However, for example, when the reflected wave comes back beyond the transmission period T and masks the direct wave as shown in FIG. 4, α is shorter than $\Delta t_{HL}$ as shown in FIG. 22A. In this case, the determination at the step a13 is no, and then the procedure returns to the step a1. On the other hand, if yes at the step a13, it is judged at step a14 that the radar 101 operates normally.

If no at the step a11, the procedure proceeds to step a15. Steps a15 and 16 are similar to the steps a6 and a7. After the step a14 or a16, the procedure is terminated at step a17.

FIGS. 10A to 10H show the operation waveforms in FIG. 8 when no reflected wave is received. FIG. 10A shows the result of executing voltage conversion of a composite wave by the detection section 65. Direct-wave determination level L becomes the lower limit and direct-wave determination level H becomes the upper limit. FIG. 10B shows output from the comparator 66. FIG. 10C shows the transmission timing indicated by a transmission modulation signal. Transmission is started at time t40 and is terminated at time t50. FIG. 10D shows the transmission and reception time difference relative to a reflected wave. FIG. 10E shows output from the comparator 108 for comparing the direct-wave determination level L with the signal level. It shows the time period over which the direct-wave determination level L is exceeded between t41 and t51. FIG. 10F shows the time period over which the comparator 109 detects the composite wave exceeding the direct-wave determination level H. FIG. 10G shows the transmission and reception time difference based on the direct-wave determination level L. FIG. 10H shows the transmission and reception time difference based on the direct-wave determination level H.

In the third embodiment, instead of comparing the determination levels with the signal level in the comparators 66, 108, 109, AD conversion may also be executed to input the digital value to the reception determination section 107. The reception determination section 107 may perform a statistical processing to enhance the determination accuracy. In a modified embodiment, the radar 101 repeats the transmission of the pulse-like signal n times as with the second embodiment. The reception determination section 107 stores each α, which is obtained from the digital values, in a memory (not shown). Then, the reception determination section 107 calculates average of α and compares the average of α with $\Delta t_{HL}$. If $\Delta t_{HL} < \alpha$, it is judged that the radar 101 operates normally. On the other hand, if $\Delta t_{HL} \geq \alpha$, the composite wave has a waveform shown in FIG. 22A or 22B. However, the waveform of FIG. 22A occurs when the reflected wave comes back beyond the transmission period T, but does not continuously occur n times. Therefore, in this case, the composite wave should have the waveform shown in FIG. 22B. That is, the direct wave is larger than the direct-wave determination level H. When the direct-wave determination level H is set to the legal upper limit of an output fluctuation, the radar 101 stops the transmission section 73 immediately. According to the modified embodiment, the radar 101 can comply with the legal upper limit of the output fluctuation surely.

The invention can be applied not only to the radars as in the embodiments, but also to any other transmission-reception apparatus such as a radio communication unit. The invention can be applied not only to transmission and reception of a radio wave, but also to transmission and reception of light, a sonic wave, etc.

What is claimed is:

1. A transmission-reception apparatus comprising:
   a transmission section which transmits a signal to a surrounding space;
   a reception section which receives the signal from the surrounding space;
   a transmission control section which controls the transmission section to transmit the signal in a pulse shape;
   a signal detection section which detects level of the signal received by the reception section; and
   an operation determination section which determines as to whether or not a timing at which the level of the received signal exceeds a first determination level is within a first time period on the basis of detection result by the signal detection section and a timing at which the transmission control section controls the transmission section to transmit the signal in the pulse shape, to determine as to whether or not the transmission section and the reception section operate normally.

2. The transmission-reception apparatus according to claim 1, wherein:
   the transmission control section controls the transmission section to transmission the signal in the pulse shape in a predetermined transmission period a plurality of times; and
   the operation determination section performs a statistical processing for the detection results from the plurality of transmissions.

3. The transmission-reception apparatus according to claim 1, wherein:
   the operation determination section determines that the transmission section and the reception section operate normally when the level of the received signal remains between the first determination level and a second determination level within a second time period from a timing at which the level of the received signal exceeds the first determination level.

4. The transmission-reception apparatus according to claim 3, wherein:
   the second determination level is set so that when the level of the received signal exceeds the second determination level, the transmitted signal is out of a legal range; and
   when the level of the received signal exceeds the second determination level before the second time period has been elapsed, the operation determination section stops the transmission of the transmission section.

5. A transmission-reception apparatus comprising:
   a transmission section which transmits a transmission wave;
   a reception section which receives a wave including a direct wave from the transmission section and a reflected wave, which is generated when a target exists;
   a control section which generates a transmission timing for controlling the transmission section to transmit the transmission wave in a pulse shape; and
   a determination section which:
     is input to the transmission timing from the control section;
     determines as to whether or not intensity of the wave received by the reception section exceeds a first determination level within a first time period; and
     determines that the transmission section and the reception section operate normally, when the intensity of the received wave exceeds the first determination level within the first time period.

6. The transmission-reception apparatus according to claim 5, wherein:
   the determination section determines that at least one of the transmission section and the reception section does not operate normally, when the intensity of the received wave has been lower than the first determination level until the first time period is elapsed.

7. The transmission-reception apparatus according to claim 5, wherein:

the determination section determines that at least one of the transmission section and the reception section does not operate normally, when the intensity of the received wave exceeds the first determination level before or after the first time period.

8. The transmission-reception apparatus according to claim 5, further comprising:

a memory, wherein:

the control section generates the transmission timing in a transmission period a plurality of times;

the determination section stores into the memory direct-wave reception timings at which the intensity of the received wave exceeds the first determination level;

the determination section performs a statistical processing for the stored direct-wave reception timings and determines as to whether or not the intensity of the received wave exceeds the first determination level within the first time period, on the basis of a result of the statistical processing.

9. The transmission-reception apparatus according to claim 5, wherein:

the determination section:

measures time from a direct-wave reception timing at which the intensity of the received wave exceeds the first determination level to a timing at which the received wave exceeds a second determination level;

compares the measured time with a second time period; and determines that the transmission section and the reception section operate normally when the measured time is longer than the second time period.

10. The transmission-reception apparatus according to claim 9, wherein:

the second determination level is set so that when the intensity of the received wave exceeds the second determination level, an intensity of the transmitted wave is out of a legal range; and when the intensity of the received wave exceeds the second determination level before the second time period has been elapsed, the determination section stops the transmission of the transmission section.

11. An operation determination method for determining as to whether or not a transmission-reception apparatus including a transmission section, which transmits a signal to a surrounding space, and a reception section, which receives the signal from the surrounding space, the method comprising:

causing the transmission section to transmit the signal in a pulse shape;

comparing level of the signal received by the reception section with a determination level;

judging as to whether or not a timing at which the level of the received signal exceeds the determination level is within a predetermined time period on a result of the comparing and a timing of the causing; and determining as to whether or not the transmission section and the reception section operate normally on the basis of a result of the judging.

* * * * *